(12) United States Patent
Higuchi et al.

(10) Patent No.: US 8,361,607 B2
(45) Date of Patent: Jan. 29, 2013

(54) ORGANIC RESIN LAMINATE

(75) Inventors: Koichi Higuchi, Annaka (JP); Mary Gilliam, Novi, MI (US); Masaaki Yamaya, Annaka (JP)

(73) Assignee: Exatec LLC, Wixom, MI (US)

( * ) Notice: Subject to any disclaimer, the term of this patent is extended or adjusted under 35 U.S.C. 154(b) by 4 days.

(21) Appl. No.: 13/086,987

(22) Filed: Apr. 14, 2011

(65) Prior Publication Data

US 2012/0263933 A1 Oct. 18, 2012

(51) Int. Cl.
  *B32B 27/08* (2006.01)
  *B32B 7/02* (2006.01)
  *B32B 5/16* (2006.01)
  *B82Y 30/00* (2011.01)

(52) U.S. Cl. ........ 428/217; 428/220; 428/328; 428/329; 977/773

(58) Field of Classification Search ............... 428/217, 428/328, 329; 977/773
See application file for complete search history.

(56) References Cited

U.S. PATENT DOCUMENTS

| | | | |
|---|---|---|---|
| 4,927,704 A | 5/1990 | Reed et al. | |
| 5,191,045 A | 3/1993 | Funaki et al. | |
| 6,213,049 B1 | 4/2001 | Yang | |
| 6,214,416 B1 * | 4/2001 | Sakagami et al. | 427/387 |
| 6,376,064 B1 | 4/2002 | Gasworth et al. | |
| 6,432,494 B1 | 8/2002 | Yang et al. | |
| 6,641,673 B2 | 11/2003 | Yang | |
| 6,681,716 B2 | 1/2004 | Schaepkens | |
| 6,948,448 B2 | 9/2005 | Schaepkens | |
| 7,056,584 B2 | 6/2006 | Iacovangelo | |
| 7,157,146 B2 | 1/2007 | Higuchi et al. | |
| 7,163,749 B2 | 1/2007 | Iacovangelo et al. | |
| 7,282,244 B2 | 10/2007 | Schaepkens et al. | |
| 7,390,573 B2 | 6/2008 | Korevaar et al. | |
| 7,595,097 B2 | 9/2009 | Iacovangelo et al. | |
| 7,645,492 B2 | 1/2010 | Gasworth | |
| 7,981,507 B2 | 7/2011 | Higuchi et al. | |
| 2003/0087102 A1 * | 5/2003 | Yamaya et al. | 428/419 |
| 2005/0202184 A1 | 9/2005 | Iacovangelo et al. | |
| 2005/0202263 A1 | 9/2005 | Sargent et al. | |
| 2007/0026235 A1 | 2/2007 | Chen et al. | |
| 2007/0286966 A1 | 12/2007 | Chen et al. | |
| 2008/0160197 A1 | 7/2008 | Gasworth et al. | |

(Continued)

FOREIGN PATENT DOCUMENTS

EP 0887437 A2 12/1998
EP 0931820 A1 7/1999

(Continued)

OTHER PUBLICATIONS

Japanese Patent No. 2000204301 (A); Publication Date: Jul. 25, 2000; Machine Translation; 40 Pages.

(Continued)

*Primary Examiner* — David Sample
*Assistant Examiner* — Tahseen N Khan
(74) *Attorney, Agent, or Firm* — Cantor Colburn LLP

(57) ABSTRACT

An organic resin laminate comprising an organic resin substrate and a multilayer coating system thereon has UV-shielding property and high mar resistance. The multilayer coating system includes an outermost layer (I) resulting from plasma polymerization of an organosilicon compound, a lower layer (II) of a silicone coating composition comprising composite oxide nanoparticle dispersion, silicone resin, curing catalyst, and solvent, and optionally a bottom layer (III) of acrylic resin.

24 Claims, 1 Drawing Sheet

U.S. PATENT DOCUMENTS

| | | | |
|---|---|---|---|
| 2008/0160205 A1 | 7/2008 | Gasworth | |
| 2008/0280149 A1 | 11/2008 | Higuchi et al. | |
| 2008/0286492 A1 | 11/2008 | Gasworth | |
| 2010/0221557 A1 | 9/2010 | Higuchi et al. | |

FOREIGN PATENT DOCUMENTS

| | | | | |
|---|---|---|---|---|
| EP | 2239308 A1 | * | 10/2010 | |
| JP | 53130732 A | * | 11/1978 | |
| JP | 63168470 A | * | 7/1988 | |
| JP | 2255532 A | | 10/1990 | |
| JP | 03014862 A | * | 1/1991 | |
| JP | 03062177 A | * | 3/1991 | |
| JP | 04106161 A | * | 4/1992 | |
| JP | 06154800 A | * | 6/1994 | |
| JP | 07278525 A | * | 10/1995 | |
| JP | 2000204301 A | | 7/2000 | |
| JP | 2000334373 A | | 12/2000 | |
| JP | 2001047574 A | * | 2/2001 | |
| JP | 2001214122 A | | 8/2001 | |
| JP | 2002060687 A | | 2/2002 | |
| JP | 2002087817 A | | 3/2002 | |
| JP | 2002187230 A | | 7/2002 | |
| JP | 2004238418 A | * | 8/2004 | |

OTHER PUBLICATIONS

Japanese Patent No. 2000334373 (A); Publication Date: Dec. 5, 2000; Machine Translation; 22 Pages.
Japanese Patent No. 2001-047574 (A); Publication Date: Feb. 20, 2001; Machine Translation; 23 Pages.
Japanese Patent No. 2001214122 (A): Publication Date: Aug. 7, 2001; Machine Translation; 21 Pages.
Japanese Patent No. 2002-060687 (A); Publication Date: Feb. 26, 2002; Machine Translation; 5 Pages.
Japanese Patent No. 2002087817 (A); Publication Date: Mar. 27, 2002; Machine Translation; 13 Pages.
Japanese Patent No. 2002187230 (A); Publication Date: Jul. 2, 2002; Machine Translation; 26 Pages.
Japanese Patent No. 2004238418 (A); Publication Date: Aug. 26, 2004; Machine Translation; 22 Pages.
Japanese Patent No. 2255532 (A); Publication Date: Oct. 16, 1990; Abstract Only; 1 Page.
International Search Report; International Application No. PCT/US2011/032483; International Filing Date: Apr. 14, 2011; Date of Mailing: Dec. 21, 2011; 5 Pages.
Written Opinion of the International Searching Authority; International Application No. PCT/US2011/032483; International Filing Date: Apr. 14, 2011; Date of Mailing: Dec. 21, 2011; 7 Pages.

* cited by examiner

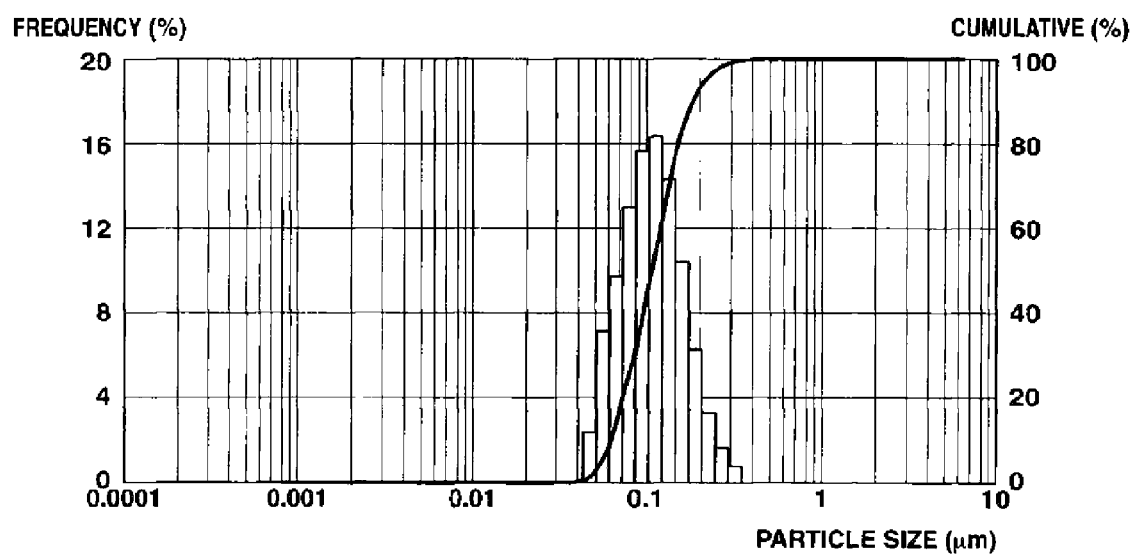

ORGANIC RESIN LAMINATE

TECHNICAL FIELD

This invention relates to an organic resin laminate having improved weather resistance and mar resistance. More particularly, it relates to an organic resin laminate comprising a molded polycarbonate substrate and a multilayer coating system thereon, the multilayer coating system including a bottom layer (III) of an acrylic resin coating film, a lower layer (II) of a silicone coating film, and an outermost layer (I) of a hard coating of plasma polymerized organosilicon compound, preferably a silicon oxide coating formed by plasma enhanced chemical vapor deposition, deposited on the substrate in the described order, the multilayer coating system possessing a very high level of mar resistance, visible light transmitting and UV shielding properties, and long-term weather resistance.

BACKGROUND ART

Because of many advantages including impact resistance, light weight, and workability, organic resin materials are used in a wide variety of applications. Efforts are currently made to take more advantage of these properties. One such approach is to apply molded organic resins having enhanced surface hardness and abrasion resistance to the windows in various vehicles. In the glazing application, a high level of abrasion resistance and outdoor weather resistance comparable to glass are required. In the case of automobiles, for example, a high level of abrasion resistance is required in order to prevent the windshield from marring upon wiper operation and to prevent side windows from marring upon winding up-and-down operation. Potential service in a very high temperature or humidity environment must also be taken into account.

In the prior art, substrates of organic resins or plastics are surface coated with various coating compositions to form surface protective films for the purpose of imparting high hardness and mar resistance. For instance, compositions comprising hydrolyzates or partial hydrolyzates of hydrolyzable organosilanes and optionally, colloidal silica are known.

For instance, JP-A S51-2736, JP-A S53-130732 and JP-A S63-168470 disclose coating compositions comprising an organoalkoxysilane, a hydrolyzate and/or partial hydrolyzate of the organoalkoxysilane, and colloidal silica, wherein the alkoxy group is converted into silanol in the presence of excess water. However, these coatings resulting from wet coating systems suffer from problems of low hardness and poor mar resistance as compared with glass or the object to be replaced.

However, several problems must be solved before coating films can withstand sunlight and weather over a long time. The wet or dry coating layers having mar resistance lack an ability to cut UV, and a phenomenon develops that a resin substrate, a primer layer for imparting substrate adhesion or an interface therebetween can be degraded or discolored by UV exposure. Several techniques are proposed to prevent such a phenomenon, including addition of UV absorber to the primer layer, and incorporation via chemical bonds of UV absorptive organic substituent groups into the organic resin of which the primer layer is formed. The UV absorptive organic substituent groups and UV absorbers refer to benzophenone, benzotriazole, triazine and similar substituent groups, and organic compounds containing the same. See JP-A H04-106161, JP 3102696, JP-A 2001-47574, and JP 3841141.

The above technique for cutting off UV is by incorporating an organic UV absorber into a primer layer. Since the primer layer in itself has the main purpose of improving the adhesion between the underlying substrate and a silicone layer, an extra amount of UV absorber loaded gives rise to problems such as losses of adhesion and transparency. It is demonstrated in a long-term outdoor exposure test and accelerated weathering test that the UV cut by the primer layer alone is insufficient for preventing degradation and discoloration of organic resin substrates.

One approach taken for compensating for such drawbacks was to add organic UV absorbers to silicone layers as well. However, simply adding such compounds to coating compositions results in a coating lacking durability. That is, the coating fails to sustain the desired UV absorbing property due to bleeding and drainage of UV absorber from the surface during long-term weather exposure. Then organic UV absorbers were developed which are silyl-modified so as to be chemically bondable with siloxane compounds, the main component of the coating layer. See JP-B S61-54800, JP-B H03-14862, JP-B H03-62177, and JP-A H07-278525. This measure improves retentivity since the UV absorber is strongly bound to the siloxane matrix. On the other hand, these coating layers become substantially poor in mar resistance that is essentially desired, or develop noticeable microcracks due to a lowering of flexibility. As discussed above, the organic UV absorbers have the essential drawback that the hardness of silicone film becomes lower as the amount of UV absorber added is increased to enhance weather resistance.

In another attempt, metal oxide nanoparticles having UV shielding property are added to coating compositions so that the compositions may maintain hardness and mar resistance. Known examples are titanium oxide nanoparticles of anatase type (JP-A 2004-238418) and titanium oxide nanoparticles of rutile type (JP 2783417, JP-A H11-310755, JP-A 2000-204301). These coating compositions form UV-shielding coatings which maintain visible light transmitting and mar resistant properties. However, titanium oxide nanoparticles have a photocatalytic activity which cannot be fully suppressed even when they are surface coated with silicon compounds. Additionally, the coatings have insufficient weather resistance in that cracks develop in a relatively early stage in an accelerated weathering test.

It is also known to use zinc oxide nanoparticles as the metal oxide nanoparticles having UV shielding property (see JP-A H11-209695, JP 3347097, and JP-A 2002-60687). In general, the zinc oxide nanoparticles have somewhat poorer UV shielding property than the titanium oxide nanoparticles and accordingly lower photocatalytic activity. However, on account of residual photocatalytic activity, a coating loaded with zinc oxide nanoparticles can not avoid a phenomenon that the coating develops cracks or peels in a weathering test.

JP 3509749 and JP-A 2002-87817 disclose an attempt to suppress photocatalytic activity by coating surfaces of zinc oxide nanoparticles with another oxide. A coating loaded with surface-coated zinc oxide nanoparticles has a longer lifetime in a weathering test than bare zinc oxide nanoparticles. However, the coating is still insufficient as outdoor UV shielding members partly because cracks develop in a long-term weathering test.

In general, visible light transparency is one of important properties of coating compositions for forming weather resistant surface protective coatings. If metal oxide nanoparticles are used as the UV shielding agent, visible light transparency is substantially impaired depending on an average particle size and a tendency to agglomerate. JP-A H11-278838 discloses that when zinc oxide nanoparticles are prepared by a specific method, a dispersion thereof has a smaller particle size and is unsusceptible to agglomeration. A coating composition having this zinc oxide nanoparticle dispersion compounded therein would be highly transparent to visible light although this is not described in Examples.

It is also proposed to deposit oxide thin films such as silicon dioxide on various cured resin layers in order to achieve the high level of abrasion and mar resistance required for automotive windows. See Patent Documents US2005/0202263A1, JP-A 2009540124T, JP-A 2009502569T, U.S. Pat. No. 7,163,749 B2, U.S. Pat. No. 7,056,584 B2, U.S. Pat. No. 6,376,064 B1, and U.S. Pat. No. 4,927,704 A. It is confirmed that these coatings resulting from dry coating systems are significantly improved in mar resistance over the aforementioned wet coatings. Additionally, the dry coatings impart protective, barrier properties onto the underlying coatings, enhancing the weatherability and increasing the lifetime of the coated window.

Expanding Thermal Plasma (ETP) processes have been used to deposit the dry coatings at high deposition rates, such as JP-A 2008504652T and U.S. Pat. No. 7,282,244 B2. Such plasma processes are suitable for coating highly abrasion and mar resistant coatings in large scale and on large area parts, such as described in JP-A 2008504652T, U.S. Pat. No. 7,282,244 B2, US 2008/0286492 A1, US 2008/0160205 A1, US 20080160197 A1, JP-A 2008509283T, U.S. Pat. No. 7,645,492 B2, U.S. Pat. No. 7,390,573 B2, U.S. Pat. No. 7,595,097 B2, U.S. Pat. No. 6,948,448 B2, U.S. Pat. No. 6,681,716 B2, U.S. Pat. No. 6,641,673 B2, JP-A 11071681, U.S. Pat. No. 6,213,049 B1.

As discussed above, a number of attempts have been made to improve the weather resistance, mar resistance and other properties of wet and dry coating films. However, there is not available a laminate having a coating system which exhibits visible light transparency and UV shielding property, and sufficient weather resistance and durability to withstand prolonged outdoor exposure while maintaining a very high level of mar resistance comparable to glass.

DISCLOSURE OF INVENTION

An object of the invention is to provide a laminate comprising an organic resin substrate and a cured coating system thereon maintaining visible light transparency, having mar resistance and UV shielding properties, and also having sufficient weather resistance and durability to withstand prolonged outdoor exposure.

Regarding a laminate comprising an organic resin substrate and a multilayer coating system thereon, the multilayer coating system including an optional bottom layer (III) in the form of an acrylic resin coating film, a lower layer (II) in the form of a hard silicone resin cured film (silicone coating cured film), and an outermost layer (I) in the form of a hard coating resulting from plasma polymerization of an organosilicon compound, preferably a silicon oxide coating formed by plasma enhanced chemical vapor deposition (PECVD), deposited on the substrate in the described order, the inventors have found that when a dispersion of composite zinc oxide nanoparticles, composite titanium oxide nanoparticles or a combination thereof to which a specific coating has been applied to suppress photocatalytic activity to a substantial extent is compounded in the silicone resin cured film as the lower layer (II), the cured film exhibits very high mar resistance, maintains visible light transparency, develops UV shielding property, and offers weather resistance and crack resistance against prolonged outdoor exposure which could not be achieved in the prior art.

The invention provides a laminate exhibiting both high mar resistance and weather resistance, and specifically, an organic resin laminate having UV-shielding property and high mar resistance at a surface, comprising an organic resin substrate and a multilayer coating system on at least one surface of the substrate. The multilayer coating system includes an outermost layer (I) which is a hard film resulting from plasma polymerization of an organosilicon compound and a lower layer (II) disposed contiguous to the outermost layer which is a cured film of a silicone coating composition. The silicone coating composition comprises:

(2-A) composite oxide nanoparticles obtained by coating surfaces of zinc oxide nanoparticles, titanium oxide nanoparticles or a combination thereof with at least one member selected from the group consisting of oxides and hydroxides of Al, Si, Zr and Sn and having no photocatalytic activity or a photocatalytic degradability of up to 25%, wherein the photocatalytic degradability (PD) is determined by irradiating black light to a methylene blue solution having said composite oxide nanoparticles uniformly dispersed therein for 12 hours, measuring the absorbance of the solution at 653 nm before and after the black light irradiation, and calculating according to the following formula:

$$PD\ (\%) = [(A_0 - A)/A_0] \times 100$$

wherein $A_0$ is the initial absorbance and A is the absorbance after the black light irradiation, (2-B) a silicone resin obtained by (co)hydrolyzing, condensing or (co)hydrolyzing-condensing at least one member selected from alkoxysilanes and partial hydrolytic condensates thereof, said alkoxysilane having the following general formula (1):

$$(R^1)_m(R^2)_n Si(OR^3)_{4-m-n} \tag{1}$$

wherein $R^1$ and $R^2$ are each independently hydrogen or a substituted or unsubstituted monovalent hydrocarbon group, and $R^1$ and $R^2$ may bond together, $R^3$ is an alkyl group having 1 to 3 carbon atoms, and m and n are independently 0 or 1 and m+n is 0, 1 or 2, (2-C) a curing catalyst, and (2-D) a solvent, the solids content of composite oxide nanoparticle dispersion (2-A) being 1 to 50% by weight based on the solids content of silicone resin (2-B).

In a preferred embodiment, the outermost layer (I) is a hard coating obtained from plasma polymerization and oxidation of an organosilicon compound and comprising silicon, oxygen, carbon and hydrogen. Expanding Thermal Plasma is the preferred method of plasma polymerization, as characterized by high deposition rate, ease of scale up to large-area parts, and producing the preferred chemical composition and physical properties.

In a more preferred embodiment, the outermost layer (I) includes an inner sub-layer and an outer sub-layer, properties of the sub-layers being adjusted so as to achieve adhesion to the lower layer (II) and to impart mar resistance to the coating system and to provide a protective barrier for the lower layer (II).

In a preferred embodiment, the properties of the outermost layer (I) and lower layer (II) are predetermined such that the laminate exhibits a pass rate of at least 97% in the adhesion test of ASTM D870 and a delta haze value of less than 2% in the Taber abrasion test of ASTM D1044. Preferably, the lower layer (II) has a transmittance at wavelength 370 nm of up to 80% when measured as a cured film of 0.5 to 3 µm thick on a quartz plate.

In a preferred embodiment, the composite oxide nanoparticles (2-A) have been further surface-treated with at least one member selected from hydrolyzable silanes and partial hydrolytic condensates thereof, said hydrolyzable silane having the following general formula (2):

$$(R^4)_x(R^5)_y Si(X)_{4-x-y} \tag{2}$$

wherein $R^4$ and $R^5$ are each independently hydrogen or a substituted or unsubstituted monovalent hydrocarbon group, X is a halogen atom, alkoxy group having 1 to 3 carbon atoms, acyloxy group having 1 to 3 carbon atoms or isocyanate group, x is 0 or 1, y is 0, 1 or 2, and x+y is 0, 1, 2 or 3.

Also preferably, the oxide nanoparticles from which the composite oxide nanoparticles (2-A) are derived have been prepared by heating and vaporizing a zinc source, titanium source or a combination thereof in direct current arc plasma, oxidizing the zinc vapor, titanium vapor or a combination thereof, and cooling. Specifically, the oxide nanoparticles from which the composite oxide nanoparticles (2-A) are derived have been prepared by heating and vaporizing a zinc source in direct current arc plasma, oxidizing the zinc vapor, and cooling. Also preferably, the composite oxide nanoparticles (2-A) have an average particle size (volume average particle size $D_{50}$) of 10 to 200 nm.

In a preferred embodiment, the silicone resin (2-B) comprises (2-E) colloidal silica. Typically, the colloidal silica (2-E) is present in an amount of 5 to 100 parts by weight per 100 parts by weight of the silicone resin (2-B).

In a preferred embodiment, the multilayer coating system further includes a bottom layer (III) disposed contiguous to the surface of the lower layer (II) that is disposed adjacent to the substrate, the bottom layer (III) being an acrylic resin coating. The bottom layer (III) is most often a cured film of an acrylic resin coating composition comprising (3-A) a vinyl copolymer having an organic UV-absorptive group and an alkoxysilyl group on side chains, (3-B) a crosslinking agent, and (3-C) a solvent. More preferably, component (3-A) in the acrylic resin coating composition of which the bottom layer (III) is formed is a copolymer of (3-A-i) a vinyl monomer having an alkoxysilyl group bonded via a Si—C bond, (3-A-ii) a vinyl monomer having an organic UV-absorptive group, and (3-A-iii) another monomer capable of copolymerizing with the vinyl monomers. More preferably, the crosslinking agent (3-B) in the acrylic resin coating composition of which the bottom layer (III) is formed is colloidal silica or a polyorganosiloxane. The acrylic resin coating composition of which the bottom layer (III) is formed may further comprise an organic UV absorber, an organic UV stabilizer or a combination thereof.

The silicone coating composition of which the lower layer (II) is formed may further comprise an organic UV absorber, an organic UV stabilizer or a combination thereof.

Most often, the organic resin substrate is a molded polycarbonate resin.

ADVANTAGEOUS EFFECTS OF INVENTION

The organic resin laminate includes a multilayer coating system which maintains visible light transparency, exhibits mar resistance and UV shielding property, and further possesses sufficient weather resistance and durability to withstand long-term outdoor exposure. The laminate finds outdoor use as windows and windshields in transporting vehicles such as automobiles and aircraft, windows in buildings, traffic noise barriers, and the like.

BRIEF DESCRIPTION OF DRAWING

FIG. 1 is a diagram showing a particle size distribution of composite zinc oxide nanoparticles in dispersion (A-1) used in Example.

DESCRIPTION OF EMBODIMENTS

The singular forms "a," "an" and "the" include plural references unless the context clearly dictates otherwise.

The notation (Cn-Cm) means a group containing from n to m carbon atoms per group.

UV refers to the ultraviolet region of the electromagnetic spectrum.

Mw refers to a weight average molecular weight as measured by gel permeation chromatography (GPC) versus polystyrene standards.

The laminate of the invention comprises a substrate and a multilayer coating system thereon. The multilayer coating system includes an optional bottom layer (III) disposed on the substrate, a lower layer (II) disposed on the substrate or bottom layer (III), and an outermost layer (I) disposed on lower layer (II). The bottom layer (III) is optional and may be omitted in some cases.

Substrate

The substrate used herein may be made of any plastic materials (organic resin substrate), for example, preferably polycarbonate, polystyrene, acrylic resins, modified acrylic resins, urethane resins, thiourethane resins, polycondensates of halogenated bisphenol A and ethylene glycol, acrylic urethane resins, halogenated aryl-containing acrylic resins, and sulfur-containing resins. These resin substrates which have been surface treated, specifically by conversion treatment, corona discharge treatment, plasma treatment, acid or alkaline treatment are also useful. Also included are laminated substrates comprising a resin substrate and a surface layer formed thereon from a resin of different type from the substrate. Exemplary laminated substrates include those consisting of a polycarbonate resin substrate and a surface layer of acrylic resin or urethane resin which are prepared by co-extrusion or lamination technique, and those consisting of a polyester resin substrate and a surface layer of acrylic resin formed thereon.

Bottom Layer III

The bottom layer (III), if used herein, is preferably an acrylic resin coating layer. Examples of the acrylic resin coating layer as attached to the substrate include laminated substrates consisting of a substrate of polycarbonate resin or the like and an overlying surface layer of acrylic resin which are prepared by co-extrusion or lamination technique and laminated substrates consisting of a substrate and a cured acrylic resin film formed on the substrate surface by applying an acrylic resin primer to the surface and curing.

Examples of the acrylic resin coating layer formed by co-extrusion or similar techniques include copolymers of methyl methacrylate with methyl acrylate or ethyl acrylate. With respect to the composition of the acrylic resin, the composition and molecular weight of the copolymer may be suitably selected in accordance with co-extrusion conditions, although copolymer compositions comprising 80 to 99% by weight of methyl methacrylate and 1 to 20% by weight of methyl or ethyl acrylate are preferred. A weight average molecular weight of 3 to about 300,000, as measured by GPC versus polystyrene standards is preferred although the molecular weight is not limited thereto. Since an acrylic resin with poor heat resistance gives rise to problems like scorching during molding, the acrylic resin may have a heat distortion temperature of at least 90° C., preferably at least 95° C., and more preferably at least 100° C. The upper limit of the heat distortion temperature is not limited, although the upper limit of the heat distortion temperature may be about 120° C. in general.

Preferred examples of the primer coating include primers based on vinyl copolymers having organic UV absorptive groups and alkoxysilyl groups on side chains. Such primers are described in JP 4041968, JP-A 2008-120986, and JP-A 2008-274177.

Specifically, the preferred acrylic resin films serving as the primer coating are cured films of acrylic resin coating compositions comprising components (3-A) to (3-C):

(3-A) a vinyl copolymer having an organic UV-absorptive group and an alkoxysilyl group on side chains, (3-B) a crosslinking agent, and (3-C) a solvent.

In the vinyl copolymer having an organic UV-absorptive group and an alkoxysilyl group bonded to side chains (3-A), preferably the alkoxysilyl group is bonded to the vinyl copolymer backbone via a Si—C bond, and more preferably the organic UV-absorptive group is also bonded to the vinyl copolymer backbone. Such copolymers may be obtained from copolymerization of monomeric components: (3-A-i) a vinyl monomer having an alkoxysilyl group bonded thereto via a Si—C bond, (3-A-ii) a vinyl monomer having an organic UV-absorptive group, and (3-A-iii) another monomer copolymerizable therewith.

Monomeric component (3-A-i) is a vinyl monomer having an alkoxysilyl group bonded thereto via a Si—C bond, which may be any of monomers having one vinyl-polymerizable functional group and at least one alkoxysilyl group in a molecule.

Suitable vinyl-polymerizable functional groups include $C_1$-$C_{12}$ organic groups containing vinyl, vinyloxy, (meth)acryloxy, and (α-methyl)styryl. Examples include vinyl, 5-hexenyl, 9-decenyl, vinyloxymethyl, 3-vinyloxypropyl, (meth)acryloxymethyl, 3-(meth)acryloxypropyl, 11-(meth)acryloxyundecyl, vinylphenyl (or styryl), isopropenylphenyl (or α-methylstyryl), and vinylphenylmethyl (or vinylbenzyl). Inter alia, (meth)acryloxypropyl is preferably used for reactivity and availability.

Examples of the alkoxy moiety in the alkoxysilyl group include methoxy, ethoxy, propoxy, isopropoxy, butoxy, isobutoxy, sec-butoxy, and tert-butoxy. Inter alia, methoxy and ethoxy are preferably used for easy control of hydrolysis and availability.

Suitable substituent groups other than the aforementioned substituent groups include alkyl groups such as methyl, ethyl, propyl, hexyl, and decyl, and phenyl. Methyl is preferred for availability.

Illustrative non-limiting examples of the vinyl monomer having an alkoxysilyl group bonded thereto via a Si—C bond (3-A-i) include methacryloxymethyltrimethoxysilane, methacryloxypropyltrimethoxysilane, methacryloxyundecyltrimethoxysilane, methacryloxypropylmethyldimethoxysilane, methacryloxypropyldimethylmethoxysilane, methacryloxypropyltriethoxysilane, acryloxypropyltrimethoxysilane, acryloxypropylmethyldimethoxysilane, acryloxypropyldimethylmethoxysilane, acryloxypropyltriethoxysilane, acryloxymethyltrimethoxysilane, acryloxyundecyltrimethoxysilane, vinyltrimethoxysilane, vinyltriethoxysilane, vinylmethyldimethoxysilane, allyltrimethoxysilane, styryltrimethoxysilane, styrylmethyldimethoxysilane, and styryltriethoxysilane. Of these, methacryloxypropyltrimethoxysilane, methacryloxypropylmethyldimethoxysilane, methacryloxypropyldimethylmethoxysilane, acryloxypropyltrimethoxysilane, and acryloxypropylmethyldimethoxysilane are preferred from the standpoints of availability, ease of handling, crosslinking density, and reactivity.

The vinyl monomer having an alkoxysilyl group bonded thereto via a Si—C bond (3-A-i) is preferably present in an amount of 1 to 50%, more preferably 3 to 40% by weight of the copolymer composition. Less than 1 wt % of vinyl monomer (3-A-i) may lead to formation of an insufficient siloxane network by crosslinking between vinyl copolymers themselves, resulting in a coating which may have not so low a coefficient of linear expansion or may not be improved in heat resistance and durability. More than 50 wt % of vinyl monomer (3-A-i) may lead to too high a crosslinking density, indicating high hardness and poor adhesion, and some alkoxysilyl groups may be left unreacted, leading to a likelihood of post-crosslinking with time or cracking.

Monomeric component (3-A-ii) is a vinyl monomer having an organic UV-absorptive group, which may be any of monomers having a UV-absorptive group and a vinyl polymerizable group in a molecule.

Examples of the vinyl monomer having an organic UV-absorptive group (3-A-ii) include (meth)acrylic monomers having a UV-absorptive group in a molecule, specifically benzotriazole compounds of the general formula (3) and benzophenone compounds of the general formula (4), both shown below.

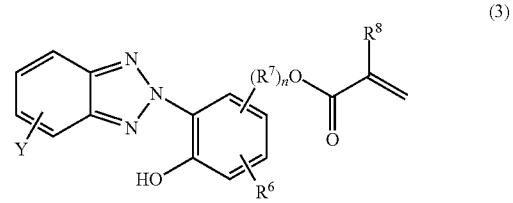

(3)

Herein Y is hydrogen or chlorine, $R^6$ is hydrogen, methyl, or $C_4$-$C_8$ tertiary alkyl group, $R^7$ is a straight or branched $C_2$-$C_{10}$ alkylene group, $R^8$ is hydrogen or methyl, and n is equal to 0 or 1.

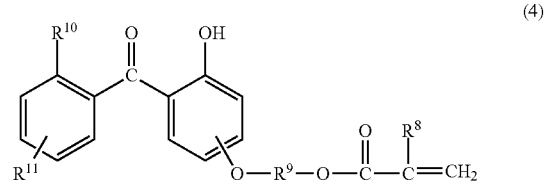

(4)

Herein $R^8$ is as defined above, $R^9$ is a substituted or unsubstituted, straight or branched $C_2$-$C_{10}$ alkylene group, $R^{10}$ is hydrogen or hydroxyl, and $R^{11}$ is hydrogen, hydroxyl, or a $C_1$-$C_6$ alkoxy group.

In formula (3), suitable $C_4$-$C_8$ tertiary alkyl groups represented by $R^6$ include tert-butyl, tert-pentyl, tert-hexyl, tert-heptyl, tert-octyl, and di-tert-octyl. Suitable straight or branched $C_2$-$C_{10}$ alkylene groups represented by $R^7$ include ethylene, trimethylene, propylene, tetramethylene, 1,1-dimethyltetramethylene, butylene, octylene, and decylene.

In formula (4), suitable straight or branched $C_2$-$C_{10}$ alkylene groups represented by $R^9$ include the same as exemplified for $R^7$, and substituted forms of these groups in which some hydrogen atoms are substituted by halogen atoms. Suitable $C_1$-$C_6$ alkoxy groups represented by $R^{11}$ include methoxy, ethoxy, propoxy, and butoxy.

Illustrative non-limiting examples of the benzotriazole compound of formula (3) include 2-(2'-hydroxy-5'-(meth)

acryloxyphenyl)-2H-benzotriazole, 2-(2'-hydroxy-3'-tert-butyl-5'-(meth)acryloxymethylphenyl)-2H-benzotriazole, 2-[2'-hydroxy-5'-(2-(meth)acryloxyethyl)phenyl]-2H-benzotriazole, 2-[2'-hydroxy-3'-tert-butyl-5'-(2-(meth)acryloxyethyl)phenyl]-5-chloro-2H-benzotriazole, and 2-[2'-hydroxy-3'-methyl-5'-(8-(meth) acryloxyoctyl)phenyl]-2H-benzotriazole.

Illustrative non-limiting examples of the benzophenone compound of formula (4) include 2-hydroxy-4-(2-(meth)acryloxyethoxy)benzophenone, 2-hydroxy-4-(4-(meth)acryloxybutoxy)benzophenone, 2,2'-dihydroxy-4-(2-(meth)acryloxyethoxy)benzophenone, 2,4-dihydroxy-4'-(2-(meth)acryloxyethoxy)benzophenone, 2,2',4-trihydroxy-4'-(2-(meth)acryloxyethoxy)benzophenone, 2-hydroxy-4-(3-(meth)acryloxy-2-hydroxypropoxy)benzophenone, and 2-hydroxy-4-(3-(meth)acryloxy-1-hydroxypropoxy)benzophenone.

The preferred UV absorbing vinyl monomers are benzotriazole compounds of formula (3), with 2-[2'-hydroxy-5'-(2-(meth)acryloxyethyl)phenyl]-2H-benzotriazole being most preferably used. The UV absorbing vinyl monomers may be used alone or in admixture.

The vinyl monomer having an organic UV absorptive group (3-A-ii) is preferably present in an amount of 1 to 30%, more preferably 3 to 25% by weight of the copolymer composition. Less than 1 wt % of vinyl monomer (3-A-ii) may lead to insufficient weatherability whereas more than 30 wt % of vinyl monomer (3-A-ii) may lead to a coating which is less adherent or displays poor appearance like whitening.

The other monomer (3-A-iii) copolymerizable with the foregoing monomers (3-A-i) and (3-A-ii) is not particularly limited as long as it is copolymerizable. Included are (meth)acrylic monomers having cyclic hindered amine structure, (meth)acrylates, (meth)acrylonitriles, (meth)acrylamides, alkyl vinyl ethers, alkyl vinyl esters, styrene, and derivatives thereof.

Examples of the (meth)acrylic monomers having cyclic hindered amine structure include 2,2,6,6-tetramethyl-4-piperidinyl methacrylate and 1,2,2,6,6-pentamethyl-4-piperidinyl methacrylate. These photostabilizers may be used in admixture of two or more.

Examples of the (meth)acrylates and derivatives thereof include (meth)acrylates of monohydric alcohols such as methyl(meth)acrylate, ethyl(meth)acrylate, n-propyl(meth)acrylate, isopropyl(meth)acrylate, n-butyl(meth)acrylate, isobutyl(meth)acrylate, sec-butyl(meth)acrylate, t-butyl(meth)acrylate, n-pentyl(meth)acrylate, isopentyl(meth)acrylate, n-hexyl(meth)acrylate, isohexyl(meth)acrylate, n-heptyl(meth)acrylate, isoheptyl(meth)acrylate, 2-ethylhexyl(meth)acrylate, n-octyl(meth)acrylate, isooctyl(meth)acrylate, n-nonyl(meth)acrylate, isononyl(meth)acrylate, n-decyl(meth)acrylate, isodecyl(meth)acrylate, n-undecyl(meth)acrylate, n-dodecyl(meth)acrylate, lauryl(meth)acrylate, palmityl(meth)acrylate, stearyl(meth)acrylate, cyclohexyl(meth)acrylate, 4-methylcyclohexyl(meth)acrylate, 4-t-butylcyclohexyl(meth)acrylate, isobornyl(meth)acrylate, dicyclopentanyl(meth)acrylate, dicyclopentenyloxyethyl(meth)acrylate, and benzyl(meth)acrylate; (meth)acrylates of alkoxy(poly)alkylene glycols such as 2-methoxyethyl(meth)acrylate, 2-methoxypropyl(meth)acrylate, 3-methoxypropyl(meth)acrylate, 2-methoxybutyl(meth)acrylate, 3-methoxybutyl(meth)acrylate, 4-methoxybutyl(meth)acrylate, methoxypolyethylene glycol (meth)acrylate (e.g., 2 to 20 ethylene glycol units), and methoxypolypropylene glycol (meth)acrylate (e.g., 2 to 20 propylene glycol units); mono(meth)acrylates of polyhydric alcohols such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, 4-hydroxybutyl(meth)acrylate, glycerin mono(meth)acrylate, pentaerythritol mono(meth)acrylate, polyethylene glycol mono(meth)acrylate (e.g., 2 to 20 ethylene glycol units), and polypropylene glycol mono(meth)acrylate (e.g., 2 to 20 propylene glycol units); poly(meth)acrylates of polyhydric alcohols such as ethylene glycol di(meth)acrylate, propylene glycol di(meth)acrylate, butylene glycol di(meth)acrylate, glycerin di(meth)acrylate, glycerin tri(meth)acrylate, pentaerythritol di(meth)acrylate, pentaerythritol tetra(meth)acrylate, 1,4-cyclohexane diol di(meth)acrylate, polyethylene glycol di(meth)acrylate (e.g., 2 to 20 ethylene glycol units), and polypropylene glycol di(meth)acrylate (e.g., 2 to 20 propylene glycol units); (poly)esters of non-polymerizable polybasic acids with hydroxyalkyl(meth)acrylates such as mono[2-(meth)acryloyloxyethyl]succinate, di[2-(meth)acryloyloxyethyl]succinate, mono[2-(meth)acryloyloxyethyl]adipate, di[2-(meth)acryloyloxyethyl]adipate, mono[2-(meth)acryloyloxyethyl]phthalate, and di[2-(meth)acryloyloxyethyl]phthalate; amino-containing (meth)acrylates such as 2-aminoethyl(meth)acrylate, 2-(N-methylamino)ethyl(meth)acrylate, 2-(N,N-dimethylamino)ethyl(meth)acrylate, 2-(N-ethylamino)ethyl(meth)acrylate, 2-(N,N-diethylamino)ethyl(meth)acrylate, 3-(N,N-dimethylamino)propyl(meth)acrylate, and 4-(N,N-dimethylamino)butyl(meth)acrylate; and epoxy-containing (meth)acrylates such as glycidyl(meth)acrylate.

Examples of the (meth)acrylonitrile derivatives include α-chloroacrylonitrile, α-chloromethylacrylonitrile, α-trifluoromethylacrylonitrile, α-methoxyacrylonitrile, α-ethoxyacrylonitrile, and vinylidene cyanide.

Examples of the (meth)acrylamide derivatives include N-methyl(meth)acrylamide, N,N-dimethyl(meth)acrylamide, N-ethyl(meth)acrylamide, N,N-diethyl(meth)acrylamide, N-methoxy(meth)acrylamide, N,N-dimethoxy(meth)acrylamide, N-ethoxy(meth)acrylamide, N,N-diethoxy(meth)acrylamide, diacetone(meth)acrylamide, N-methylol(meth)acrylamide, N-(2-hydroxyethyl)(meth)acrylamide, N,N-dimethylaminomethyl(meth)acrylamide, N-(2-dimethylamino)ethyl(meth)acrylamide, N,N'-methylenebis(meth)acrylamide, and N,N'-ethylenebis(meth)acrylamide.

Examples of the alkyl vinyl ether include methyl vinyl ether, ethyl vinyl ether, butyl vinyl ether, and hexyl vinyl ether. Examples of the alkyl vinyl ester include vinyl formate, vinyl acetate, vinyl acrylate, vinyl butyrate, vinyl caproate, and vinyl stearate. Examples of styrene and its derivatives include styrene, α-methylstyrene, and vinyltoluene.

Of the foregoing monomers, preference is given to the (meth)acrylates, specifically methyl(meth)acrylate, ethyl(meth)acrylate, isopropyl(meth)acrylate, n-butyl(meth)acrylate, isobutyl(meth)acrylate, n-hexyl(meth)acrylate, 2-ethylhexyl(meth)acrylate, isononyl(meth)acrylate, lauryl(meth)acrylate, cyclohexyl(meth)acrylate, 4-methylcyclohexyl(meth)acrylate, 4-t-butylcyclohexyl(meth)acrylate, isobornyl(meth)acrylate, dicyclopentanyl(meth)acrylate, and dicyclopentenyloxyethyl(meth)acrylate.

As the other copolymerizable monomer (3-A-iii), the foregoing monomers may be used alone or in admixture of two or more.

The other copolymerizable monomer (3-A-iii) is preferably used in an amount of 20 to 98%, more preferably 35 to 94% by weight of the copolymer composition. Too much amounts of monomer (3-A-iii) may lead to insufficient crosslinking between vinyl copolymers themselves or with crosslinker (3-B), resulting in a coating which may have not so low a coefficient of linear expansion or may not be improved in heat resistance, durability or weatherability. Too less amounts of monomer (3-A-iii) may lead to a coating which has too high a crosslinking density and poor adhesion, or displays defective appearance like whitening.

The vinyl copolymer (3-A) may be readily prepared from the vinyl monomer having an alkoxysilyl group bonded thereto via a Si—C bond (3-A-i), the vinyl monomer having an organic UV-absorptive group (3-A-ii), and the other copolymerizable monomer (3-A-iii), by dissolving the monomers in a solvent, adding a radical polymerization initiator selected from peroxides (e.g., dicumyl peroxide and benzoyl peroxide) and azo compounds (e.g., azobisisobutyronitrile) to the solution, and heating the solution at a temperature of 50 to 150° C., especially 70 to 120° C. for 1 to 10 hours, especially 3 to 8 hours.

The vinyl copolymer should preferably have a weight average molecular weight of 1,000 to 300,000, more preferably 5,000 to 250,000, as measured by GPC versus polystyrene standards. A copolymer having too high Mw may have too high a viscosity and thus be difficult to synthesize or handle. A copolymer having too low Mw may lead to a coating which displays defective appearance like whitening or lacks adhesion, durability or weatherability.

In the acrylic resin coating compositions for the primer, the crosslinking agent (3-B) is preferably used along with vinyl copolymer having an organic UV-absorptive group and an alkoxysilyl group bonded to side chains (3-A). The crosslinking agent (3-B) is typically selected from (i) hydrolyzable silicon compounds, hydrolytic condensates thereof or a combination of the hydrolyzable silicon compounds and the hydrolytic condensates, (ii) colloidal silica, and (iii) polyorganosiloxanes.

Reference is first made to the hydrolyzable silicon compounds, hydrolytic condensates thereof or a combination of the hydrolyzable silicon compounds and the hydrolytic condensates. The hydrolyzable silicon compound or hydrolytic condensate thereof is preferably an organosilicon compound having a nitrogen atom and an alkoxysilyl group in a molecule or hydrolytic condensate thereof.

The organosilicon compound having a nitrogen atom and an alkoxysilyl group in a molecule which can be used as crosslinker (3-B) is described in detail. The compounding of the organosilicon compound having a nitrogen atom and an alkoxysilyl group in a molecule (3-B) has many advantages. First it imparts fully water-resistant adhesion to the primer coating layer. Since it crosslinks with the hydrolyzable silyl group, SiOH group or both of the hydrolyzable silyl group and SiOH group in the vinyl polymer having a hydrolyzable silyl group, SiOH group or both of the hydrolyzable silyl group and SiOH group, and an organic UV absorptive group bonded to side chains (3-A), the coating is densified. Since the crosslinking reaction is promoted by the nitrogen atom in the organosilicon compound (3-B) so that the amount of residual alkoxysilyl groups in the coating may be reduced, crack development by post-crosslinking with time can be suppressed. In addition, the UV absorber and photostabilizer which are optionally added can be effectively anchored within the primer coating layer.

The preferred crosslinker (3-B) is a compound having at least one nitrogen atom and at least one alkoxysilyl group in a molecule, and more preferably a compound having at least one nitrogen atom and at least two alkoxysilyl groups in a molecule. Suitable compounds include amino-containing alkoxysilanes, amino-containing di(alkoxysilanes), amide-containing alkoxysilanes, an amidated form of the reaction product of an amino-containing alkoxysilane, an epoxy-containing alkoxysilane, and a silylating agent, the reaction product of an amino-containing alkoxysilane with a dicarboxylic anhydride, the reaction product of an amino-containing alkoxysilane with a (poly)(meth)acrylic compound, the reaction product of an amino-containing alkoxysilane with a (meth)acrylic-containing alkoxysilane, the reaction product of a polyamine compound with a (meth)acrylic-containing alkoxysilane, an amidated form of the reaction product of an amino-containing alkoxysilane with a polyisocyanate compound, and (poly)silane compounds containing an isocyanurate ring. Of these, the amidated form of the reaction product of an amino-containing alkoxysilane, an epoxy-containing alkoxysilane, and a silylating agent, and the reaction product of an amino-containing alkoxysilane with a dicarboxylic anhydride are desirable.

Examples of the compounds which can be used to form crosslinker (3-B) are given below. Suitable amino-containing alkoxysilanes include 3-aminopropyltrimethoxysilane, 3-aminopropyltriethoxysilane, 3-aminopropylmethyldimethoxysilane, 3-aminopropylmethyldiethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(2-aminoethyl)-3-aminopropylmethyldiethoxysilane, 3-(trimethoxysilylpropyl)aminopropyltrimethoxysilane, 3-(triethoxysilylpropyl)aminopropyltriethoxysilane, 2-(trimethoxysilylpropyl)aminoethyl-3-aminopropyltrimethoxysilane, 2-(triethoxysilylpropyl)aminoethyl-3-aminopropyltriethoxy-silane, N-phenyl-3-aminopropyltrimethoxysilane, N-vinylbenzyl-3-aminopropyltriethoxysilane, and hydrogen chloride salts thereof.

A typical amino-containing di(alkoxysilane) is bis(trimethoxysilylpropyl)amine.

Suitable amide-containing alkoxysilanes include ureidopropyltrimethoxysilane, ureidopropyltriethoxysilane, ureidopropylmethyldimethoxysilane, and ureidopropylmethyldiethoxysilane.

Suitable dicarboxylic anhydrides include maleic anhydride, phthalic anhydride, tetrahydrophthalic anhydride, hexahydrophthalic anhydride, methyl-substituted tetrahydrophthalic anhydride, methyl-substituted hexahydrophthalic anhydride, 3,6-endomethylenetetrahydrophthalic anhydride, and methyl-substituted 3,6-endomethylenetetrahydrophthalic anhydride.

Suitable (poly)(meth)acrylic compounds include alkyl methacrylates such as methyl methacrylate, butyl methacrylate and 2-ethylhexyl methacrylate; alkyl acrylates such as methyl acrylate, ethyl acrylate and butyl acrylate; acrylamide, acrylonitrile, and ethylene glycol dimethacrylate.

Suitable polyamine compounds include ethylenediamine, diethylenetriamine, triethylenetriamine, tetraethylenepentamine, and piperazine.

Suitable polyisocyanate compounds include toluene diisocyanate, diphenylmethane diisocyanate, hexamethylene diisocyanate, 2,2,4-trimethylhexamethylene diisocyanate, 2,4,4-trimethylhexamethylene diisocyanate, p-phenylene diisocyanate, 4,4'-dicyclohexylmethane diisocyanate, 3,3'-dimethyldiphenyl-4,4'-diisocyanate, dianisidine diisocyanate, m-xylene diisocyanate, isophorone diisocyanate, 1,5-naphthalene diisocyanate, trans-1,4-cyclohexyl diisocyanate, lysine diisocyanate, dimethyltriphenylmethane tetraisocyanate, triphenylmethane triisocyanate, and tris(isocyanatophenyl)thiophosphate.

Suitable (meth)acrylic-containing alkoxysilanes include those compounds exemplified above as the acrylic monomer containing an alkoxysilyl group.

Suitable isocyanurate ring-containing silanes include tris(trimethoxysilylpropyl) isocyanurate, bis(trimethoxysilylpropyl)allyl isocyanurate, and tris(triethoxysilylpropyl) isocyanurate.

The amidated form of the reaction product of an amino-containing alkoxysilane, an epoxy-containing alkoxysilane and a silylating agent may be prepared as follows. Suitable amino-containing alkoxysilanes include those compounds exemplified above although N-(2-aminoethyl)-3-aminopropyltrimethoxysilane and N-(2-aminoethyl)-3-aminopropylmethyldimethoxysilane are preferred for adhesion and maneuverability. The epoxy-containing alkoxysilane used herein is not particularly limited although γ-glycidoxypropyltrimethoxysilane, γ-glycidoxypropylmethyldimethoxysilane, and β-(3,4-epoxycyclohexyl)ethylmethyldimethoxysilane are preferred for reactivity and maneuverability. Suitable silylating agents used herein include hexamethyldisilazane, N,N'-bis(trimethylsilyl)formamide, and N,N'-bis(trimethylsilyl)urea. The silylating agent functions to protect the OH group formed by reaction of an amino-containing alkoxysilane with an epoxy-containing alkoxysilane for preventing reaction between OH and alkoxysilyl groups, thus preventing any change of the reaction product with time.

The reaction of an amino-containing alkoxysilane, an epoxy-containing alkoxysilane and a silylating agent may be carried out by adding dropwise the epoxy-containing alkoxysilane to a mixture of the amino-containing alkoxysilane and the silylating agent and heating the mixture for reaction, or by reacting the amino-containing alkoxysilane with the epoxy-containing alkoxysilane, adding the silylating agent to the reaction product and allowing reaction to run. The reaction conditions may be selected as appropriate although the preferred conditions include a temperature of 50 to 150° C., especially 80 to 140° C. and a time of 1 to 12 hours, especially 3 to 8 hours.

In this reaction, the amino-containing alkoxysilane and the epoxy-containing alkoxysilane are used in such amounts as to give a molar ratio of epoxy/amino (=N—H) in the range of 0.3 to 1.2. If the molar ratio of epoxy/amino is less than 0.3, the resulting compound may have fewer alkoxy groups participating in crosslinking, leading to a weaker curability, and may lack the overall spread of the molecule, leading to poor surface adhesion and low bond strength. If the same ratio is more than 1.2, the resulting compound contains few =N—H groups which can be amidated in the subsequent amidation step, losing water-resistant adhesion.

The reaction product is further amidated to become the relevant component. Amidation may be effected by a reaction with a halide, anhydride or isopropenyl ester of a carboxylic acid such as acetic acid chloride, acetic acid bromide, propionic acid chloride, acetic anhydride, isopropenyl acetate, or benzoyl chloride.

The reaction product of an amino-containing alkoxysilane with a dicarboxylic acid anhydride may be prepared as follows. The amino-containing alkoxysilanes used herein include those exemplified above although 3-aminopropyltrimethoxysilane, 3-aminopropyltriethoxysilane, and 3-aminopropylmethyldiethoxysilane are preferred for adhesion and stability.

The dicarboxylic acid anhydrides used herein include those exemplified above although tetrahydrophthalic anhydride, hexahydrophthalic anhydride, methyl-substituted tetrahydrophthalic anhydride, methyl-substituted hexahydrophthalic anhydride, 3,6-endomethylenetetrahydrophthalic anhydride, and methyl-substituted 3,6-endomethylenetetrahydrophthalic anhydride are preferred for adhesion and stability.

The reaction of an amino-containing alkoxysilane with a dicarboxylic acid anhydride may be carried out by adding dropwise the amino-containing alkoxysilane to the dicarboxylic acid anhydride and effecting reaction, or inversely by adding dropwise the dicarboxylic acid anhydride to the amino-containing alkoxysilane and effecting reaction. The reaction conditions may be selected as appropriate although the preferred conditions include a temperature of 0 to 150° C., especially 20 to 120° C. and a time of 1 to 12 hours, especially 2 to 8 hours.

In this reaction, the amino-containing alkoxysilane and the dicarboxylic acid anhydride are used in such amounts as to give a molar ratio of amino (—$NH_2$)/dicarboxylic acid anhydride in the range of 0.3 to 1.8. If this molar ratio is less than 0.3, the reaction product may have fewer alkoxy groups participating in crosslinking, leading to weak curability and poor adhesion. If the ratio is more than 1.8, a primer composition may have lower storage stability on account of the amino group in the unreacted amino-containing alkoxysilane.

The second example of crosslinker (3-B) is colloidal silica or silica nanoparticles in an organic solvent. Since silica nanoparticles have SiOH groups on surfaces, they form siloxane crosslinks with hydrolyzable silyl groups and/or SiOH groups in the vinyl polymer (3-A) to form an organic-inorganic composite. As a result, the bottom layer has a lower coefficient of linear expansion, preventing the lower layer (II) and outermost layer (I) from cracking.

The silica nanoparticles should preferably have a primary particle size of 0.5 to 100 nm, when the dispersion thereof and the transparency of the cured primer coating are taken into account. A primary particle size of 2 to 50 nm is more preferred. Silica nanoparticles having primary particle size in excess of 100 nm may have poor dispersion stability, cause defects to the appearance of the laminate, and substantially detract from the transparency of the laminate.

As the silica nanoparticles dispersed in organic solvents, colloidal silica dispersed in organic solvents, also referred to as organosilica sol, is preferred. Examples include ethylene glycol-dispersed silica sol, ethylene glycol/mono-n-propyl ether-dispersed silica sol, Ethyl Cellosolve-dispersed silica sol, Butyl Cellosolve-dispersed silica sol, propylene glycol monomethyl ether-dispersed silica sol, propylene glycol monomethyl ether acetate-dispersed silica sol, methyl ethyl ketone-dispersed silica sol, and methyl isobutyl ketone-dispersed silica sol.

The silica nanoparticles dispersed in organic solvents may be used alone or in admixture of more than one type.

Notably the colloidal silica dispersed in organic solvent is commercially available. Exemplary commercial products include PMA-ST (used in Examples to be described later), MEK-ST, MIBK-ST, IPA-ST-L, IPA-ST-MS, EG-ST-ZL, DMAC-ST-ZL, and XBA-ST (Nissan Chemical Industries, Ltd.), OSCAL 1132, 1332, 1532, 1722, and ELCOM ST-1003SIV (JGC C&C).

The third example of crosslinker (3-B) is an organopolysiloxane having the general formula (5).

$$(R^{12})_a Si(Z)_b O_{(4-a-b)/2} \tag{5}$$

Herein $R^{12}$ which may be the same or different is a substituted or unsubstituted monovalent hydrocarbon group of 1 to 18 carbon atoms other than an amino-containing monovalent hydrocarbon group, Z which may be the same or different is hydroxyl, $C_1$-$C_3$ alkoxy, $C_2$-$C_4$ alkoxyalkoxy, $C_1$-$C_6$ acyloxy, $C_1$-$C_6$ alkenoxy, or isocyanate group, a and b are numbers satisfying 0<a<2, 0<b<3, and 0<a+b<4.

Since this organopolysiloxane has a hydrolyzable silyl group, SiOH group or both of the hydrolyzable silyl group and SiOH group in a molecule, it forms siloxane crosslinks with hydrolyzable silyl groups, SiOH groups or both of the hydrolyzable silyl groups and SiOH groups in the vinyl polymer (3-A) to produce a composite.

In formula (5), $R^{12}$ is each independently selected from substituted or unsubstituted monovalent $C_1$-$C_{18}$ hydrocarbon groups other than amino-containing monovalent hydrocarbon groups, for example, alkyl, aryl, haloalkyl, haloaryl and alkenyl groups, and substituted forms of the foregoing hydrocarbon groups in which some hydrogen atoms are substituted by epoxy, (meth)acryloxy, or mercapto groups, as well as organic groups separated by heteroatom such as O or S. Examples include alkyl groups such as methyl, ethyl, propyl, isopropyl, butyl, hexyl, decyl, and cyclohexyl; aryl groups such as phenyl and phenethyl; haloalkyl groups such as 3-chloropropyl, 3,3,3-trifluoropropyl, 3,3,4,4,5,5,6,6,6-nonafluorohexyl; haloaryl groups such as p-chlorophenyl; alkenyl groups such as vinyl, allyl, 9-decenyl and p-vinylbenzyl; epoxy-containing organic groups such as 3-glycidoxypropyl, β-(3,4-epoxycyclohexyl)ethyl and 9,10-epoxydecyl; (meth)acryloxy-containing organic groups such as γ-methacryloxypropyl and γ-acryloxypropyl; and mercapto-containing organic groups such as γ-mercaptopropyl and p-mercaptomethylphenylethyl. Of these, alkyl groups are preferred particularly when the primer composition is used in the application where mar resistance and weatherability are required, and epoxy and (meth)acryloxy-substituted hydrocarbon groups are preferred where adhesion is required.

Z is each independently selected from hydroxyl, $C_1$-$C_3$ alkoxy, $C_2$-$C_4$ alkoxyalkoxy, $C_1$-$C_6$ acyloxy, $C_1$-$C_6$ alkenoxy, and isocyanate groups, for example, methoxy, ethoxy, propoxy, isopropoxy, methoxymethoxy, methoxyethoxy, acetoxy, and isopropenyl. Inter alia, methoxy, ethoxy and isopropoxy are preferred when the reactivity of organopolysiloxane is taken into account.

The subscripts a and b are numbers satisfying 0<a<2, 0<b<3, and 0<a+b<4, and preferably 0.2≦a≦1.7, 0.1≦b≦2.7, and 0.3≦a+b≦3.7.

The organopolysiloxane serving as crosslinker (3-B) may be obtained from (co)hydrolytic condensation of one or more silane compounds of the general formula (6) or partial hydrolytic condensates by any well-known method. The (co)hydrolytic condensates of such silane compounds may be used alone or in admixture of more than one type.

$(R^{13})_c Si(A)_{4-c}$ (6)

Herein $R^{13}$ is the same as $R^{12}$ in formula (5), A which may be the same or different is a $C_1$-$C_3$ alkoxy, $C_2$-$C_4$ alkoxyalkoxy, $C_1$-$C_6$ acyloxy, $C_1$-$C_6$ alkenoxy, or isocyanate group, and c is an integer of 0 to 2.

In formula (6), A is each independently selected from $C_1$-$C_3$ alkoxy, $C_2$-$C_4$ alkoxyalkoxy, $C_1$-$C_6$ acyloxy, $C_1$-$C_6$ alkenoxy, and isocyanate groups, for example, methoxy, ethoxy, propoxy, isopropoxy, methoxymethoxy, methoxyethoxy, acetoxy, and isopropenoxy. Inter alia, methoxy, ethoxy and isopropenoxy are preferred because the hydrolytic condensation has high reactivity, and the alcohol and ketone A-H formed have high vapor pressures and are thus easy to distill off.

Examples of the silane compound satisfying the above conditions include trialkoxy or triacyloxysilanes such as methyltrimethoxysilane, methyltriethoxysilane, methyltris(2-methoxyethoxy)silane, methyltriacetoxysilane, methyltripropoxysilane, methyltriisopropenoxysilane, ethyltrimethoxysilane, ethyltriethoxysilane, vinyltrimethoxysilane, vinyltriethoxysilane, vinyltriacetoxysilane, vinyltris(2-methoxyethoxy)silane, vinyltriisopropenoxysilane, phenyltrimethoxysilane, phenyltriethoxysilane, phenyltriacetoxysilane, γ-chloropropyltrimethoxysilane, γ-chloropropyltriethoxysilane, γ-chloropropyltripropoxysilane, 3,3,3-trifluoropropyltrimethoxysilane, γ-glycidoxypropyltrimethoxysilane, γ-glycidoxypropyltriethoxysilane, β-(3,4-epoxycyclohexyl)ethyltrimethoxysilane, β-(3,4-epoxycyclohexyl)ethyltriethoxysilane, γ-methacryloxypropyltrimethoxysilane, γ-acryloxypropyltrimethoxysilane, γ-mercaptopropyltrimethoxysilane, γ-mercaptopropyltriethoxysilane, as well as partial hydrolytic condensates of methyltrimethoxysilane which are commercially available under the tradenames KC-89C and X-40-9220 from Shin-Etsu Chemical Co., Ltd., and partial hydrolytic condensates of methyltrimethoxysilane and γ-glycidoxypropyltrimethoxysilane which are commercially available under the tradename X-41-1056 from Shin-Etsu Chemical Co., Ltd.

Also useful are dialkoxysilanes and diacyloxysilanes such as dimethyldimethoxysilane, dimethyldiethoxysilane, dimethyldi(2-methoxyethoxy)silane, dimethyldiacetoxysilane, dimethyldipropoxysilane, dimethyldiisopropenoxysilane, vinylmethyldimethoxysilane, vinylmethyldiethoxysilane, vinylmethyldiacetoxysilane, vinylmethyldi(2-methoxyethoxy)silane, vinylmethyldiisopropenoxysilane, phenylmethyldimethoxysilane, phenylmethyldiethoxysilane, phenylmethyldiacetoxysilane, γ-propylmethyldimethoxysilane, γ-propylmethyldiethoxysilane, γ-propylmethyldipropoxysilane, 3,3,3-trifluoropropylmethyldimethoxysilane, γ-glycidoxypropylmethyldimethoxysilane, γ-glycidoxypropylmethyldiethoxysilane, β-(3,4-epoxycyclohexyl)ethylmethyldimethoxysilane, β-(3,4-epoxycyclohexyl)ethylmethyldiethoxysilane, γ-methacryloxypropylmethyldimethoxysilane, γ-acryloxypropylmethyldimethoxysilane, γ-mercaptopropylmethyldimethoxysilane, and γ-mercaptopropylmethyldiethoxysilane.

Examples of the tetraalkoxysilane include methyl silicate, ethyl silicate, n-propyl silicate, etc. Also included are partial hydrolytic condensates of tetramethoxysilane which are commercially available under the tradename of M Silicate 51 from Tama Chemicals Co., Ltd., MSI51 from Colcoat Co., Ltd., MS51 and MS56 from Mitsubishi Chemical Co., Ltd., partial hydrolytic condensates of tetraethoxysilane which are commercially available under the tradename of Silicate 35 and Silicate 45 from Tama Chemicals Co., Ltd., ESI40 and ESI48 from Colcoat Co., Ltd., and partial co-hydrolytic condensates of tetramethoxysilane and tetraethoxysilane which are commercially available under the tradename of FR-3 from Tama Chemicals Co., Ltd., and EMSi48 from Colcoat Co., Ltd.

Also included are bissilane compounds such as bis(trimethoxysilyl)ethane, bis(trimethoxysilyl)hexane, bis(trimethoxysilyl)decane, bis(triethoxysilyl)hexane, bis(trimethoxysilyl)benzene, and bis(trimethoxysilyloxydimethylsilyl)benzene.

For example, the organopolysiloxane as crosslinker (3-B) may be obtained from (co)hydrolysis of a silicon compound of formula (5) or partial hydrolytic condensate thereof alone or in admixture of two or more, in water at pH 1 to 7, preferably pH 2 to 6, and more preferably pH 2 to 5. For the hydrolysis, metal oxide nanoparticles, typically colloidal silica, dispersed in water may also be used. A catalyst may be added to the system for adjusting its pH to the described range and to promote hydrolysis. Suitable catalysts include organic acids and inorganic acids such as hydrogen fluoride, hydrochloric acid, nitric acid, formic acid, acetic acid, propionic acid, oxalic acid, citric acid, maleic acid, benzoic acid, malonic acid, glutaric acid, glycolic acid, methanesulfonic acid, and toluenesulfonic acid, solid acid catalysts such as cation exchange resins having carboxylate or sulfonate groups on the surface, and water-dispersed metal oxide nanoparticles such as acidic water-dispersed colloidal silica. Alternatively, a dispersion of metal oxide nanoparticles such as colloidal silica in water or organic solvent may be co-present upon hydrolysis.

For the hydrolysis, water may be used in an amount of 20 to 3,000 parts by weight per 100 parts by weight of the silicon compound of formula (6) and partial hydrolytic condensate combined. An excess amount of water may not only lead to a reduction of system efficiency, but also give rise to a problem that when the hydrolyzate is formulated in a final primer composition, the hydrolyzate may have a reduced solubility in the vinyl polymer (3-A), and the remaining water can adversely affect to detract from coating and drying efficiencies. With these taken into account, the amount of water is preferably from 50 parts to 200 parts by weight. Less than 20 pbw of water may produce an organopolysiloxane whose weight average molecular weight (Mw) does not build up to reach the optimum range to be described later, the Mw being determined by GPC versus polystyrene standards.

To produce the organopolysiloxane as crosslinker (3-B), the hydrolysis must be followed by condensation. Condensation may be effected continuous to the hydrolysis while maintaining the liquid temperature at room temperature or heating at a temperature of not higher than 100° C. A temperature higher than 100° C. may cause gelation. Condensation may be promoted by distilling off the alcohol or ketone formed by hydrolysis at a temperature of at least 80° C. and atmospheric or subatmospheric pressure. Also for the purpose of promoting condensation, condensation catalysts such as basic compounds, acidic compounds or metal chelates may be added. Prior to or during the condensation step, an organic solvent may be added for the purpose of adjusting the progress of condensation or the concentration, or a dispersion of metal oxide nanoparticles such as colloidal silica in water or organic solvent may also be added. For the reason that an organopolysiloxane generally builds up its molecular weight and reduces its solubility in water or alcohol formed as condensation proceeds, the organic solvent added herein should preferably be one having a boiling point of at least 80° C. and a relatively highly polarity in which the organopolysiloxane is fully dissolvable. Examples of the organic solvent include alcohols such as isopropyl alcohol, n-butanol, isobutanol, t-butanol, and diacetone alcohol; ketones such as methyl propyl ketone, diethyl ketone, methyl isobutyl ketone, cyclohexanone, and diacetone alcohol; ethers such as dipropyl ether, dibutyl ether, anisole, dioxane, ethylene glycol monoethyl ether, ethylene glycol monobutyl ether, propylene glycol monomethyl ether, and propylene glycol monomethyl ether acetate; and esters such as propyl acetate, butyl acetate, and cyclohexyl acetate.

The organopolysiloxane resulting from condensation should preferably have a weight average molecular weight (Mw) of at least 1,000, more preferably 1,000 to 50,000, and even more preferably 1,500 to 20,000, as measured by GPC versus polystyrene standards. With a Mw below the range, a coating tends to have low toughness and insufficient adhesion. On the other hand, a polysiloxane with too high a Mw may become less soluble in the vinyl polymer (3-A) so that the resins in a coating undergo phase separation, causing inefficient coating operation and incurring film whitening.

In the coating composition from which the bottom layer (III) of the laminate is formed, the vinyl polymer having a hydrolyzable silyl group, SiOH group or both of the hydrolyzable silyl group and SiOH group and an organic UV-absorptive group bonded to side chains (3-A) and the crosslinker (3-B) are used in such amounts that there are present 100 parts by weight as resin content of vinyl polymer (3-A) and 0.1 to 100 parts by weight, preferably 1 to 50 parts by weight as solids of crosslinker (3-B). When more than 100 pbw of crosslinker (3-B) is added, the composition or coating may have too high a crosslinking density as bottom layer (III), which is detrimental to adhesion to the substrate or a polysiloxane coating as the lower layer (II). When less than 0.1 pbw of crosslinker (3-B) is added, the composition or coating may have too low a crosslinking density, failing to achieve the desired adhesion to the substrate or the lower layer (II) or crack resistance.

Other constituents may be added to the coating composition from which the bottom layer (III) of the laminate is formed. In the embodiment wherein the bottom layer (III) is an acrylic resin cured film, a thermoplastic vinyl resin may be compounded. The thermoplastic vinyl resin, if compounded, can impart flexibility to the acrylic resin cured film as bottom layer (III) and restrain a phase change and softening phenomenon from occurring with changes of environmental temperature, especially in a relatively high temperature region. It is then effective in restraining distortion of bottom layer (III), and eventually preventing cracks from developing in the overlying lower layer (II) and outermost layer (I). Additionally, it imparts heat resistance and water resistance to the bottom layer (III) itself.

The thermoplastic vinyl resin may be compounded in an amount of 0 to 50 parts by weight, and if used, preferably 1 to 50 parts, more preferably 3 to 45 parts by weight per 100 parts by weight of the effective components in the cured film as bottom layer (III), that is, the total as solids of components (3-A) and (3-B). Addition of more than 50 pbw of the thermoplastic vinyl resin may reduce the crosslinking density of a coating, leading to a lower hardness.

To the acrylic resin coating film as bottom layer (III), a photostabilizer having at least one cyclic hindered amine structure or hindered phenol structure in a molecule may be added. The photostabilizer used herein should preferably be compatible with the acrylic resin and low volatile.

Examples of the photostabilizer used herein include 3-dodecyl-1-(2,2,6,6-tetramethyl-4-piperidinyl)pyrrolidine-2,5-dione, N-methyl-3-dodecyl-1-(2,2,6,6-tetramethyl-4-piperidinyl)pyrrolidine-2,5-dione, N-acetyl-3-dodecyl-1-(2,2,6,6-tetramethyl-4-piperidinyl)pyrrolidine-2,5-dione, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidyl) 1,2,3,4-butane-tetracarboxylate, tetrakis(1,2,2,6,6-pentamethyl-4-piperidyl) 1,2,3,4-butane-tetracarboxylate, the condensate of 1,2,3,4-butanetetracarboxylic acid, 2,2,6,6-tetramethyl-4-piperidinol and tridecanol, 8-acetyl-3-dodecyl-7,7,9,9-tetramethyl-1,3,8-triazaspiro[4,5]decane-2,4-dione, the condensate of 1,2,3,4-butanetetracarboxylic acid, 1,2,6,6-pentamethyl-4-piperidinol and $\beta,\beta,\beta',\beta'$-tetramethyl-3,9-(2,4,8,10-tetraoxaspiro[5,5]undecane)diethanol, and the condensate of 1,2,3,4-butanetetracarboxylic acid, 2,2,6,6-pentamethyl-4-piperidinol and $\beta,\beta,\beta',\beta'$-tetramethyl-3,9-(2,4,8,10-tetraoxaspiro[5,5]undecane)diethanol. Also useful are photostabilizers which are modified by silylation for the purpose of anchoring the photostabilizers as described in JP-B S61-

56187, for example, 2,2,6,6-tetramethylpiperidino-4-propyltrimethoxysilane, 2,2,6,6-tetramethylpiperidino-4-propylmethyldimethoxysilane, 2,2,6,6-tetramethylpiperidino-4-propyltriethoxysilane, 2,2,6,6-tetramethylpiperidino-4-propylmethyldiethoxysilane, and (partial) hydrolyzates thereof. These photostabilizers may be used in admixture of two or more.

The photostabilizer may be added in an amount of 0 to 10 parts by weight and if used, preferably 1 to 10 parts by weight per 100 parts by weight of the effective components in the acrylic resin coating as bottom layer (III). More than 10 pbw of the photostabilizer may adversely affect the adhesion of the coating.

To the acrylic resin coating film as bottom layer (III), an organic UV absorber may be added insofar as it does not adversely affect the coating film. Those organic UV absorbers compatible with the primer composition are preferred. Those compound derivatives whose main skeleton is hydroxybenzophenone, benzotriazole, cyanoacrylate or triazine are more preferred. Vinyl and other polymers having the UV absorber incorporated in a side chain are also useful. Examples include 2,4-dihydroxybenzophenone, 2,2',4,4'-tetrahydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-t-methylphenyl)benzotriazole, 2-(2-hydroxy-5-t-octylphenyl)benzotriazole, 2-(2-hydroxy-3,5-di-t-butylphenyl)benzotriazole, ethyl-2-cyano-3,3-diphenylacrylate, 2-ethylhexyl-2-cyano-3,3-diphenylacrylate, and 2-(2-hydroxy-4-hexyloxyphenyl)-4,6-diphenyltriazine. These UV absorbers may be used in admixture of two or more.

Functional metal oxide nanoparticles may also be added to the composition of bottom layer (III) as long as they do not adversely affect the bottom layer. Those metal oxide nanoparticles which permit a coating loaded therewith to maintain certain transparency without white clouding may be used. Examples of such nanoparticles include titanium oxide, cerium oxide, zinc oxide, tin oxide, zirconium oxide, antimony oxide, tungsten oxide, antimony-doped tin oxide, tin-doped indium oxide, iron oxide, and alumina, in single or composite metal oxide form, and mixtures thereof.

The nanoparticulate metal oxide may be added in an amount of 0 to 30 parts by weight and if used, preferably 1 to 30 parts by weight per 100 parts by weight of the effective components in the acrylic resin coating as bottom layer (III). More than 30 pbw of the metal oxide may detract from coating transparency.

In the embodiment wherein the acrylic resin coating as bottom layer (III) is a cured film of primer coating, the acrylic resin coating composition may further comprise a solvent as component (3-C). The solvent used herein may be any of solvents in which components (i) or (iii) as components (3-A) and (3-B) are dissolvable. Preferred examples of the solvent include diacetone alcohol, propylene glycol monomethyl ether, ethylene glycol monomethyl ether, propylene glycol monoethyl ether, ethylene glycol monoethyl ether, isobutyl alcohol, isopropyl alcohol, n-butyl alcohol, n-propyl alcohol, acetone, methyl ethyl ketone, methyl isobutyl ketone, acetylacetone, ethyl acetate, butyl acetate, xylene, and toluene.

The solvent (3-C) is preferably used in such amounts to give a concentration of 5 to 20% by weight of the effective components.

For the purpose of smoothening a coating, fluorochemical or silicone surfactants such as Fluorad FC-4430 (3M) and KP-341 (Shin-Etsu Chemical Co., Ltd.) may be added in effective amounts. For the purpose of promoting cure of a coating, cros slinking cure catalysts such as Neostann U-810 (Nitto Kasei Co., Ltd.), B-7 (Nippon Soda Co., Ltd.) and Orgatix ZA-60 and TC-200 (Matsumoto Fine Chemical Co., Ltd.) may be added in catalytic amounts.

The bottom layer (III) preferably has a thickness of 1 to 80 μm, more preferably 3 to 60 μm, and even more preferably 5 to 50 μm, when it is an acrylic resin layer formed by co-extrusion. The bottom layer (III) preferably has a thickness of 3 to 30 μm, and more preferably 3 to 20 μm, when it is a cured film of primer coating. A layer of less than 1 μm thick may fail to provide the desired weatherability. A layer of more than 80 μm thick may substantially detract from the impact resistance of polycarbonate resin and be uneconomical. In the case of primer coating, coating efficiency may become low.

It is not particularly limited how to apply the primer coating, and any coating techniques including roll coating, dip coating, flow coating, bar coating, spray coating, and spin coating may be used.

The acrylic resin coating film as bottom layer (III) may be formed on at least one surface of a resin substrate directly or via an interlayer, if desired, such as an adhesion promoting layer, UV absorbing layer, printing layer, recording layer, thermal barrier layer, adhesive layer or inorganic vapor deposited layer.

On the surface of bottom layer (III) that is disposed remote from the substrate, the lower layer (II) and outermost layer (I) are deposited to construct a laminate which exhibits a high level of weatherability due to the effect of UV absorptive groups in bottom layer (III).

Lower Layer II

The lower layer (II) used in the laminate of the invention is a cured film of a silicone coating composition comprising components (2-A) to (2-D):

(2-A) a dispersion in a dispersing medium of composite oxide nanoparticles obtained by coating surfaces of zinc oxide nanoparticles, titanium oxide nanoparticles or a combination of zinc oxide nanoparticles and titanium oxide nanoparticles with at least one member selected from the group consisting of oxides and hydroxides of Al, Si, Zr and Sn, the composite oxide nanoparticle dispersion having a photocatalytic degradability of up to 25%, wherein the photocatalytic degradability (PD) is determined by adding the composite oxide nanoparticle dispersion to a methylene blue solution, irradiating black light to the methylene blue solution for 12 hours, measuring the absorbance of the solution at 653 nm before and after the black light irradiation, and calculating a change of absorbance before and after the black light irradiation according to the following formula:

$$PD\ (\%) = [(A_0 - A)/A_0] \times 100$$

wherein $A_0$ is the initial absorbance and $A$ is the absorbance after the black light irradiation, (2-B) a silicone resin obtained from (co)hydrolytic condensation of at least one member selected from alkoxysilanes and partial hydrolytic condensates thereof, the alkoxysilane having the following general formula (1):

$$(R^1)_m(R^2)_n Si(OR^3)_{4-m-n} \tag{1}$$

wherein $R^1$ and $R^2$ are each independently hydrogen or a substituted or unsubstituted monovalent hydrocarbon group, and $R^1$ and $R^2$ may bond together, $R^3$ is a $C_1$-$C_3$ alkyl group, and subscripts m and n are independently 0 or 1 and m+n is 0, 1 or 2, (2-C) a curing catalyst, and (2-D) a solvent.

These components are described in detail. Component (2-A) is a dispersion in a dispersing medium of composite oxide nanoparticles obtained by coating surfaces of zinc oxide nanoparticles, titanium oxide nanoparticles or a combination of zinc oxide nanoparticles and titanium oxide nanoparticles with at least one member selected from the group consisting of oxides and hydroxides of Al, Si, Zr and Sn. The composite oxide nanoparticle dispersion should have a photocatalytic degradability of up to 25%. As used herein, the photocatalytic degradability (PD) is determined by adding the composite oxide nanoparticle dispersion to a methylene blue solution, irradiating black light to the methylene blue solution for 12 hours, measuring the absorbance of the solution at 653 nm before and after the black light irradiation, and calculating a change of absorbance before and after the black light irradiation according to the following formula:

$$PD\ (\%) = [(A_0 - A)/A_0] \times 100$$

wherein $A_0$ is the initial absorbance and $A$ is the absorbance after the black light irradiation.

More preferably, the composite oxide nanoparticles are obtained by heating a zinc source, titanium source or a combination of zinc and titanium source in a direct current arc plasma for vaporization, oxidizing the metal vapor, cooling, thus forming metal oxide nanoparticles, coating surfaces of the metal oxide nanoparticles with at least one member selected from oxides and hydroxides of Al, Si, Zr and Sn, and treating the coated particles. The resulting composite oxide nanoparticles are then dispersed in a dispersing medium to yield a composite oxide nanoparticle dispersion.

The (surface-coated) composite oxide nanoparticles are characterized by a fully low photocatalytic activity. In general, oxide nanoparticles have a UV shielding function and a photocatalyst function at the same time. If such oxide nanoparticles are used as a UV shielding agent in a hard coat composition, their photocatalyst function can degrade the binder so that the hard coat may develop cracks. By contrast, the (surface-coated) composite oxide nanoparticles have a very low photocatalytic activity, minimizing crack formation. Since the (surface-coated) composite oxide nanoparticles are prepared by coating surfaces of oxide nanoparticles with an oxide or hydroxide, typically silica, and are preferably further surface treated with a hydrolyzable silane, their photocatalytic activity is fully minimized.

The photocatalytic activity may be evaluated by measuring a change of absorbance by photodegradation of methylene blue. Specifically, 0.15 g calculated as composite oxide nanoparticle solids of the (surface-coated) composite oxide nanoparticle dispersion is added to 20 g of a methylene blue solution in water/methanol (1:1 weight ratio) having a methylene blue concentration of 0.01 mmol/L. The solution is stirred in the dark for 30 minutes, and then irradiated with black light at a power of 15 W for 12 hours. Thereafter, the solution was centrifuged at 3,000 rpm for 15 minutes to collect the supernatant, and the absorbance of methylene blue at 653 nm is measured by a UV/visible spectrophotometer. A photocatalytic degradability (PD) is computed from the absorbances before and after the black light irradiation according to the following formula:

$$PD\ (\%) = [(A_0 - A)/A_0] \times 100$$

wherein $A_0$ is the initial absorbance and $A$ is the absorbance after the black light irradiation. The (surface-coated) composite oxide nanoparticles should have a photocatalytic degradability (PD) of up to 25%, and preferably up to 23%.

The composite oxide nanoparticles having a photocatalytic degradability of up to 25% may be obtained by selecting a nanoparticulate composite oxide having a low photocatalytic activity or coating surfaces of composite oxide nanoparticles with the surface treating agent.

Oxide nanoparticles may be prepared by several plasma methods including DC arc plasma, plasma jet, and high-frequency plasma. The DC arc plasma method is most preferred because of a propensity to form composite oxide nanoparticles having a low photocatalytic activity and high productivity. Since the oxide nanoparticles prepared by the DC arc plasma method have very strong adsorptivity probably because of good surface crystallinity so that they strongly adsorb amino, imino, quaternary ammonium or other functional groups in the dispersant, the particles are uniformly dispersed while they do not adsorb each other. As a result, a coating composition having compounded therein the oxide nanoparticles prepared by the DC arc plasma method may form a coating which is highly transparent and free of turbidity.

The DC arc plasma method which is preferably used in preparing oxide nanoparticles involves the steps of providing a consumable anode made of a metal source such as metallic zinc, metallic titanium or a combination of metallic zinc and titanium, producing a plasma flame of argon gas from a cathode, heating the metal source for evaporation, and oxidizing the metal vapor, followed by cooling. By this method, oxide nanoparticles are effectively prepared, which have an average particle size (volume average particle size $D_{50}$) in the range of 10 to 200 nm as measured by the light scattering method.

For component (2-A), composite oxide nanoparticles are prepared by coating surfaces of metal oxide nanoparticles with at least one member selected from oxides and hydroxides of Al, Si, Zr and Sn. Examples of the composite oxide nanoparticles include those in which metal oxide nanoparticles are provided with an oxide coating by using an alkoxide of Al, Si, Zr or Sn and effecting hydrolysis, and those which are obtained by adding a sodium silicate aqueous solution to metal oxide nanoparticles, neutralizing the solution for causing an oxide or hydroxide to precipitate on particle surfaces, and optionally further heating the precipitated oxide or hydroxide to enhance crystallinity.

In the composite oxide nanoparticles, the coating weight of oxide, hydroxide or a combination of oxide and hydroxide is preferably 0.1 to 20% by weight, and more preferably 1 to 10% by weight. If the coating weight is less than 0.1 wt %, then such a coating is ineffective for controlling photocatalytic activity, and particularly in the case of oxide, difficult to improve chemical resistance. If the coating weight is more than 20 wt %, then the amount of the core metal oxide is less than 80 wt %, sometimes leading to a loss of UV shielding efficiency per unit weight.

In a preferred embodiment, the composite oxide nanoparticles are further surface treated with at least one member selected from hydrolyzable silanes and partially hydrolytic condensates thereof, to produce surface-coated composite oxide nanoparticles. The hydrolyzable silane has the following general formula (2):

$$(R^4)_x(R^5)_y Si(X)_{4-x-y} \qquad (2)$$

wherein $R^4$ and $R^5$ are each independently hydrogen or a substituted or unsubstituted monovalent hydrocarbon group, X is a halogen atom, $C_1$-$C_3$ alkoxy group, $C_1$-$C_3$ acyloxy group or isocyanate group, x is 0 or 1, y is 0, 1 or 2, and x+y is 0, 1, 2 or 3.

Specifically, surface treatment is carried out by adding a hydrolyzable silane of formula (2) to the composite oxide nanoparticles, hydrolyzing the silane in the presence of water and a basic organic compound, and effecting silanol condensation reaction of the hydrolyzate. This is the so-called sol-gel process.

In formula (2), $R^4$ and $R^5$ are each independently selected from hydrogen and substituted or unsubstituted monovalent hydrocarbon groups. The monovalent hydrocarbon groups are preferably those of 1 to 12 carbon atoms, more preferably 1 to 8 carbon atoms, for example, alkyl, alkenyl, aryl and aralkyl groups. In the case of substituted monovalent hydrocarbon groups, exemplary substituents include halogen atoms such as chlorine and fluorine, amino, epoxy, glycidyloxy, mercapto, (meth)acryloyloxy, and carboxyl. X is a halogen atom, $C_1$-$C_3$ alkoxy group, $C_1$-$C_3$ acyloxy group or isocyanate group. The subscript x is 0 or 1, y is 0, 1 or 2, and x+y is 0, 1, 2 or 3.

Illustrative, non-limiting examples of the hydrolyzable silane include tetrafunctional silanes such as tetramethoxysilane, tetraethoxysilane, tetra(n-propoxy)silane, tetraisopropoxysilane, and tetra(n-butoxy)silane; trifunctional silanes such as methyltrimethoxysilane, methyltriethoxysilane, n-propyltrimethoxysilane, isopropyltrimethoxysilane, n-butyltrimethoxysilane, tert-butyltrimethoxysilane, n-hexyltrimethoxysilane, n-octyltrimethoxysilane, isooctyltrimethoxysilane, dodecyltrimethoxysilane, octadecyltrimethoxysilane, cyclohexyltrimethoxysilane, benzyltrimethoxysilane, phenyltrimethoxysilane, phenyltriethoxysilane, 4-butylphenyltrimethoxysilane, 3-aminopropyltrimethoxysilane, 3-aminopropyltriethoxysilane, 3-glycidyloxypropyltrimethoxysilane, 3-glycidyloxypropyltriethoxysilane, 3-mercaptopropyltrimethoxysilane, 3-acryloyloxypropyltrimethoxysilane, 3-carboxypropyltrimethoxysilane, (3,3,3-trifluoropropyl)trimethoxysilane, (3,3,3-trifluoropropyl)triethoxysilane, pentafluorophenyltrimethoxysilane, and pentafluorophenyltriethoxysilane; difunctional silanes such as dimethyldimethoxysilane, dimethyldiethoxysilane, dibutyldimethoxysilane, dihexyldimethoxysilane, didodecyldimethoxysilane, methyloctyldimethoxysilane, dodecylmethyldimethoxysilane, diphenyldimethoxysilane, and diphenyldiethoxysilane; and monofunctional silanes such as triethylmethoxysilane, triethylethoxysilane, tripropylmethoxysilane, triphenylmethoxysilane, triphenylethoxysilane, diphenylmethylmethoxysilane, and diphenylmethylethoxysilane.

Suitable partial hydrolytic condensates of hydrolyzable silanes which can be used herein include partial hydrolytic condensates of tetramethoxysilane which are commercially available under the tradename of M Silicate 51 from Tama Chemicals Co., Ltd., MS151 from Colcoat Co., Ltd., MS51 and MS56 from Mitsubishi Chemical Co., Ltd., partial hydrolytic condensates of tetraethoxysilane which are commercially available under the tradename of Silicate 35 and Silicate 45 from Tama Chemicals Co., Ltd., ESI40 and ESI48 from Colcoat Co., Ltd., partial co-hydrolytic condensates of tetramethoxysilane and tetraethoxysilane which are commercially available under the tradename of FR-3 from Tama Chemicals Co., Ltd., and EMSi48 from Colcoat Co., Ltd.

Of these, preference is given to tetraalkoxysilanes such as tetramethoxysilane and tetraethoxysilane; trialkoxysilanes such as methyltrimethoxysilane, methyltriethoxysilane, n-propyltrimethoxysilane, isopropyltrimethoxysilane, n-butyltrimethoxysilane, n-hexyltrimethoxysilane, n-octyltrimethoxysilane, and dodecyltrimethoxysilane; dialkoxysilanes such as dimethyldimethoxysilane, dimethyldiethoxysilane, dibutyldimethoxysilane, dihexyldimethoxysilane, octylmethyldimethoxysilane, and dodecylmethyldimethoxysilane; and partial hydrolytic condensates of the foregoing.

As the alkoxysilane, fluoroalkyl or fluoroaryl-containing alkoxysilanes such as (3,3,3-trifluoropropyl)trimethoxysilane, (3,3,3-trifluoropropyl)triethoxysilane, pentafluorophenyltrimethoxysilane, and pentafluorophenyltriethoxysilane may also be used alone or in admixture, for imparting improved water resistance, humidity resistance and stain resistance to the surface treatment layer.

These hydrolyzable silanes and partial hydrolytic condensates thereof may be used alone or in admixture of two or more. From the standpoint of forming a surface treatment layer on composite oxide nanoparticles, the amount of monofunctional silane used is preferably up to 70 mol % of the overall silanes. Similarly, the amount of tri- and tetrafunctional silanes used is preferably 1 to 90 mol % of the overall silanes. From the standpoint of improving the denseness of the surface treatment layer for enhancing water resistance, acid resistance, zinc anti-leaching, and photocatalysis-blocking ability, the amount of tri- and tetrafunctional silanes used is more preferably up to 80 mol %, even more preferably up to 70 mol % and more preferably at least 5 mol %, even more preferably at least 10 mol %.

The hydrolyzable silanes and partial hydrolytic condensates thereof are preferably used in such amounts that a ratio of moles of silicon atoms in the hydrolyzable silane to moles of total metal atoms in the composite oxide nanoparticles may range from 0.1 to 100. For the purposes of increasing the content of oxide per unit weight, the upper limit of the amount of hydrolyzable silane is such that the ratio is more preferably up to 70 and even more preferably up to 50. For the purposes of imparting anti-agglomeration to composite oxide nanoparticles, the lower limit of the amount of hydrolyzable silane is such that the ratio is more preferably at least 0.5 and even more preferably at least 1.

For the surface treatment of composite oxide nanoparticles, a basic organic compound is preferably used as the catalyst for hydrolysis of the hydrolyzable silane or partial hydrolytic condensate thereof and subsequent silanol condensation reaction. Suitable basic organic compounds include tertiary amines such as trimethylamine, triethylamine, tri-n-propylamine, triisopropylamine, tributylamine, diisopropylethylamine, triphenylamine, N-methylpyrrolidine, and N-methylpiperidine; and nitrogen-containing heterocyclics such as pyridine, methylpyridine, dimethylpyridine, trimethylpyridine and quinoline. Of these, preferred are tertiary amines of 6 to 12 carbon atoms such as triethylamine, tri-n-propylamine, triisopropylamine, tributylamine, diisopropylethylamine, N-methylpyrrolidine, and N-methylpiperidine.

The basic organic compound is preferably used in an amount of 0.001 to 10% by weight based on the hydrolyzable silane or partial hydrolytic condensate. For the purposes of controlling reaction and imparting anti-agglomeration to composite oxide nanoparticles, the amount of basic compound is more preferably up to 8 wt %, and even more preferably up to 5 wt %. From the standpoint of reaction rate or the like, the amount of basic compound is more preferably at least 0.002 wt %, and even more preferably at least 0.005 wt %.

The amount of water used for hydrolysis of the hydrolyzable silane or partial hydrolytic condensate is preferably such that the moles of water is 0.1 to 10 times the moles of hydrolyzable groups in the hydrolyzable silane. For the purposes of controlling hydrolysis of the hydrolyzable silane and silanol condensation reaction, the moles of water is more preferably up to 7 times, even more preferably up to 5 times the moles of hydrolyzable groups. From the standpoints of hydrolysis and silanol condensation reaction, the moles of water is more preferably at least 0.3 time, even more preferably at least 0.5 time the moles of hydrolyzable groups.

With respect to the surface treatment of composite oxide nanoparticles, the procedure and order of addition of the hydrolyzable silane or partial hydrolytic condensate, basic organic compound, and water are not particularly limited. Exemplary procedures, all starting with a liquid phase containing the composite oxide nanoparticles, include (1) a procedure of first adding the hydrolyzable silane to the liquid phase, then adding the basic organic compound and water sequentially or simultaneously thereto, (2) a procedure of first adding the basic organic compound to the liquid phase, then adding the hydrolyzable silane and water sequentially or simultaneously thereto, and (3) a procedure of premixing the hydrolyzable silane, basic organic compound and water, and adding the premix to the liquid phase. Of these, the step of finally adding water is preferred for the control of reaction, and the procedure including first adding the hydrolyzable silane to the liquid phase, then adding the basic organic compound, and finally adding water is most preferred.

From the standpoint of dispersion stability, it is preferred to add a dispersant to the (surface-coated) composite oxide nanoparticle dispersion. Since the dispersant has an organic functional group that adsorbs and segregates to surfaces of inorganic particles, and plays the role of protecting nanoparticles, it is essential in preparing a dispersion having a high stability. Exemplary organic functional groups include hydroxyl, carboxyl, sulfonic acid, phosphoric acid, amino, imino, quaternary ammonium, quaternary phosphonium, and salts of the foregoing, amide, and acetylacetonato groups. Of these, carboxyl, phosphoric acid groups, and sodium and ammonium salts thereof are preferred. The preferred compounds having such a functional group and contributing more to dispersion are organic polymers having these functional groups on side chains. Exemplary dispersants include organic polymers derived from at least one of functional monomers such as (meth)acrylic acid, phosphoric acid group-containing (meth)acrylates, hydroxyalkyl(meth)acrylates, maleic anhydride, and sulfonic acid group-containing styrene, and more preferably ionic surfactants such as polyacrylates including (meth)acrylic acid, maleic anhydride, and phosphoric acid group-containing (meth)acrylates, polyester amines, fatty acid amines, sulfonic acid amides, caprolactones, quaternary ammonium salts; nonionic surfactants such as polyoxyethylene and polyol esters; water-soluble polymers such as hydroxypropyl cellulose, and polysiloxane. Useful dispersants are commercially available under the tradename of Poise 520, 521, 532A and 2100 (Kao Corp.), Disperbyk 102, 161, 162, 163, 164, 180 and 190 (BYK), Aron T-40 (To a Gosei Co., Ltd.), Solsperse 3000, 9000, 17000, 20000, and 24000 (Zeneka Co., Ltd.). They may be used alone or in admixture.

The dispersant is preferably used in an amount of 0.5 to 30 parts, more preferably 1 to 20 parts by weight per 100 parts by weight as solids of the (surface-coated) composite oxide nanoparticles. Less than 0.5 pbw of the dispersant may fail to achieve the desired effect. More than 30 pbw of the dispersant may detract from the mar resistance and weatherability of a coating.

The (surface-coated) composite oxide nanoparticle dispersion (2-A) is a dispersion of the (surface-coated) composite oxide nanoparticles described above in a dispersing medium. The dispersing medium used herein is not particularly limited. Exemplary media include water, alcohols such as methanol, ethanol, isopropanol, n-butanol, isobutanol, stearyl alcohol, oleyl alcohol, and lauryl alcohol, aromatic hydrocarbons such as toluene and xylene, esters such as ethyl acetate and butyl acetate, ketones such as methyl ethyl ketone and methyl isobutyl ketone, glycol ethers such as ethyl cellosolve and propylene glycol monomethyl ether, and saturated hydrocarbons such as n-hexane, and mixtures thereof.

The amount of the (surface-coated) composite oxide nanoparticles dispersed is not particularly limited. They are preferably dispersed in a concentration as high as possible, but in a range not breaking dispersion. Usually the dispersion contains 5 to 80% by weight, preferably 10 to 60% by weight of the (surface-coated) composite oxide nanoparticles. A concentration of less than 5 wt % corresponds to a higher proportion of the dispersing medium, which may result in a lower concentration of total solids after addition of silicone resin (2-B) thereto, failing to form a coating with an appropriate thickness. A concentration in excess of 80 wt % may impair dispersion stability or cause a viscosity buildup and hence, handling inconvenience.

A mechanical grinding/dispersing apparatus may be any of well-known apparatus such as a bead mill, jet mill, attritor, sand mill, ultrasonic mill, and disk mill. The bead mill using beads is preferred because component (2-A) is finished shortly. Exemplary bead mills include Minizeta, Labstar, Star Mill LMZ and Star Mill ZRS by Ashizawa Finetec, Ltd., Ultra-Apex Mill by Kotobuki Industries Co., Ltd., and Maxvisco Mill by Imex Co., Ltd. The dispersing time varies depending on the diameter and identity of beads, and the peripheral speed of the mill. In general, beads of a ceramic material such as alumina or zirconia having a diameter of 0.03 to 0.5 mm are used. The bead mill is preferably operated for a grinding time of 20 minutes to 5 hours, more preferably 30 minutes to 3 hours.

When the dispersant described above is used, it should preferably be co-present when the (surface-coated) composite oxide nanoparticles and dispersing medium are mechanically ground and dispersed on the above-mentioned apparatus. If only the (surface-coated) composite oxide nanoparticles and dispersing medium are mechanically ground and dispersed before the dispersant is added, the resulting agglomerates may be difficultly disintegrated to the desired average particle size.

The (surface-coated) composite oxide nanoparticle dispersion as component (2-A) should preferably have an average particle size (volume average particle size $D_{50}$) in the range of 10 to 200 nm as measured by the light scattering method. Particles with an average particle size in excess of 200 nm may lead to a coating having low visible light transmittance. A volume average particle size $D_{50}$ of up to 150 nm is more preferred. Particles with a volume average particle size $D_{50}$ of less than 10 nm may be inconvenient to handle. While the particle size distribution does not depend on a measuring instrument, the average particle size is defined herein as measured by Nanotrac UPA-EX150 by Nikkiso Co., Ltd. or LA-910 by Horiba Mfg. Co., Ltd.

It is noted that component (2-A) used herein is commercially available, for example, as ZNTANB 15 wt %-E16, E15, E16-(1), and E16-(2) by C.I. Kasei Co., Ltd.

Component (2-A) is compounded with component (2-B) such that the (surface-coated) composite oxide nanoparticles as solids in component (2-A) are preferably present in an amount of 1 to 50% by weight, more preferably 3 to 35% by weight, based on the solids of the silicone resin (2-B). If the amount of the (surface-coated) composite oxide nanoparticles as solids is less than 1 wt %, the desired UV shielding capability may not be obtainable. If the amount of the (surface-coated) composite oxide nanoparticles as solids is more than 50 wt %, it may be difficult to form a coating having visible light transparency and mar resistance.

Component (2-B) in the silicone coating composition of lower layer (II) is a silicone resin obtained from (co)hydrolytic condensation of at least one member selected from alkoxysilanes and partial hydrolytic condensates thereof. The alkoxysilane has the general formula (1):

$(R^1)_m(R^2)_n Si(OR^3)_{4-m-n}$      (1)

wherein $R^1$ and $R^2$ are each independently hydrogen or a substituted or unsubstituted monovalent hydrocarbon group, and $R^1$ and $R^2$ may bond together, $R^3$ is a $C_1$-$C_3$ alkyl group, and m and n are independently 0 or 1 and m+n is 0, 1 or 2.

In formula (1), $R^1$ and $R^2$ are each independently selected from hydrogen and substituted or unsubstituted monovalent hydrocarbon groups, preferably of 1 to 12 carbon atoms, more preferably 1 to 8 carbon atoms, for example, hydrogen; alkyl groups such as methyl, ethyl, propyl, butyl, pentyl, hexyl, heptyl and octyl; cycloalkyl groups such as cyclopentyl and cyclohexyl; alkenyl groups such as vinyl and allyl; aryl groups such as phenyl; halo-substituted hydrocarbon groups such as chloromethyl, γ-chloropropyl, and 3,3,3-trifluoropropyl; and (meth)acryloxy, epoxy, mercapto, amino or isocyanato-substituted hydrocarbon groups such as γ-methacryloxypropyl, γ-glycidoxypropyl, 3,4-epoxycyclohexylethyl, γ-mercaptopropyl, γ-aminopropyl, and γ-isocyanatopropyl. An isocyanurate group having a plurality of isocyanato-substituted hydrocarbon groups bonded together is also exemplary. Of these, alkyl groups are preferred for the application where mar resistance and weatherability are required, and epoxy, (meth)acryloxy and isocyanurate-substituted hydrocarbon groups are preferred where toughness and dyeability are required.

$R^3$ is selected from $C_1$-$C_3$ alkyl groups, for example, methyl, ethyl, n-propyl, and isopropyl. Of these, methyl and ethyl are preferred because the alkoxysilane is highly reactive in hydrolytic condensation and the alcohol $R^3OH$ formed can be readily distilled off due to a high vapor pressure.

The alkoxysilane of formula (1) wherein m=0 and n=0 is (2-B-i) a tetraalkoxysilane of the formula: $Si(OR^3)_4$ or a partial hydrolytic condensate thereof. Examples of suitable tetraalkoxysilane and partial hydrolytic condensate thereof include tetramethoxysilane, tetraethoxysilane, tetraisopropoxysilane, tetrabutoxysilane; partial hydrolytic condensates of tetramethoxysilane, which are commercially available under the trade name of M Silicate 51 from Tama Chemicals Co., Ltd., MSI51 from Colcoat Co., Ltd., and MS51 and MS56 from Mitsubishi Chemical Co., Ltd.; partial hydrolytic condensates of tetraethoxysilane, which are commercially available under the trade name of Silicate 35 and Silicate 45 from Tama Chemicals Co., Ltd., ESI40 and ESI48 from Colcoat Co., Ltd.; and partial co-hydrolytic condensates of tetramethoxysilane and tetraethoxysilane, which are commercially available under the trade name of FR-3 from Tama Chemicals Co., Ltd. and EMSi48 from Colcoat Co., Ltd.

The alkoxysilane of formula (1) wherein m=1 and n=0 or m=0 and n=1 is (2-B-ii) a trialkoxysilane of the formula: $R^1Si(OR^3)_3$ or $R^2Si(OR^3)^3$ or a partial hydrolytic condensate thereof. Examples of suitable trialkoxysilane and partial hydrolytic condensate thereof include hydrogentrimethoxysilane, hydrogentriethoxysilane, methyltrimethoxysilane, methyltriethoxysilane, methyltriisopropoxysilane, ethyltrimethoxysilane, ethyltriethoxysilane, ethyltriisopropoxysilane, propyltrimethoxysilane, propyltriethoxysilane, propyl-triisopropoxysilane, phenyltrimethoxysilane, vinyltrimethoxysilane, allyltrimethoxysilane, γ-methacryloxypropyltrimethoxysilane, γ-methacryloxypropyltriethoxysilane, γ-acryloxypropyltrimethoxysilane, γ-glycidoxypropyltrimethoxysilane, γ-glycidoxypropyltriethoxysilane, β-(3,4-epoxycyclohexyl)ethyltrimethoxysilane, γ-chloropropyltrimethoxysilane, 3,3,3-trifluoropropyltrimethoxysilane, 3,3,3-trifluoropropyltriethoxysilane, perfluorooctylethyltrimethoxysilane, γ-mercaptopropyltrimethoxysilane, γ-aminopropyltrimethoxysilane, γ-aminopropyltriethoxysilane, N-(2-aminoethyl)aminopropyltrimethoxysilane, γ-isocyanatopropyltrimethoxysilane, γ-isocyanatopropyltriethoxysilane, tris(3-trimethoxysilylpropyl)isocyanurate and tris(3-triethoxysilylpropyl)isocyanurate in which isocyanate groups are bonded together; and partial hydrolytic condensates of methyltrimethoxysilane, which are commercially available as KC-89S and X-40-9220 from Shin-Etsu Chemical Co., Ltd.; and partial hydrolytic condensates of methyltrimethoxysilane and γ-glycidoxypropyltrimethoxysilane, which are commercially available as X-41-1056 from Shin-Etsu Chemical Co., Ltd.

The alkoxysilane of formula (1) wherein m=1 and n=1 is (2-B-iii) a dialkoxysilane of the formula: $(R^1)(R^2)Si(OR^3)_2$ or a partial hydrolytic condensate thereof. Examples of suitable dialkoxysilane and partial hydrolytic condensate thereof include methylhydrogendimethoxysilane, methylhydrogendiethoxysilane, dimethyldimethoxysilane, dimethyldiethoxysilane, methylethyldimethoxysilane, diethyldimethoxysilane, diethyldiethoxysilane, methylpropyldimethoxysilane, methylpropyldiethoxysilane, diisopropyldimethoxysilane, phenylmethyldimethoxysilane, vinylmethyldimethoxysilane, γ-glycidoxypropylmethyldimethoxysilane, γ-glycidoxypropylmethyldiethoxysilane, β-(3,4-epoxycyclohexyl)ethylmethyldimethoxysilane, γ-methacryloxypropylmethyldimethoxysilane, γ-methacryloxypropylmethyldiethoxysilane, γ-mercaptopropylmethyldimethoxysilane, γ-aminopropylmethyldiethoxysilane, and N-(2-aminoethyl)aminopropylmethyldimethoxysilane.

The silicone resin as component (2-B) may be prepared using the foregoing components (2-B-i), (2-B-ii) and (2-B-iii) in any desired proportion. For the purpose of improving storage stability, mar resistance and crack resistance, it is preferred to use 0 to 50 Si-mol % of component (2-B-i), 50 to 100 Si-mol % of component (2-B-ii) and 0 to 10 Si-mol % of component (2-B-iii), based on the total amount of components (2-B-i), (2-B-ii) and (2-B-iii) which is equal to 100 Si-mol %. It is more preferred to use 0 to 30 Si-mol % of component (2-B-i), 70 to 100 Si-mol % of component (2-B-ii) and 0 to 10 Si-mol % of component (2-B-iii). If the main component (2-B-ii) is less than 50 Si-mol %, the resin may have a lower crosslinking density and less curability, tending to form a cured film with a lower hardness. If component (2-B-i) is in excess of 50 Si-mol %, the resin may have a higher crosslinking density and a lower toughness to permit crack formation.

It is noted that Si-mol % is a percentage based on the total Si moles, and the Si mole means that in the case of a monomer, its molecular weight is 1 mole, and in the case of a dimer, its average molecular weight divided by 2 is 1 mole.

The silicone resin as component (2-B) may be prepared through (co)hydrolytic condensation of components (2-B-i), (2-B-ii) and (2-B-iii) by a well-known method. For example, an alkoxysilane (2-B-i), (2-B-ii) or (2-B-iii) or partial hydrolytic condensate thereof or a mixture thereof is (co)hydrolyzed in water at pH 1 to 7.5, preferably pH 2 to 7. At this point, metal oxide nanoparticles dispersed in water such as silica sol may be used. A catalyst may be added to the system for adjusting its pH to the described range and to promote hydrolysis. Suitable catalysts include organic acids and inorganic acids such as hydrogen fluoride, hydrochloric acid, nitric acid, formic acid, acetic acid, propionic acid, oxalic acid, citric acid, maleic acid, benzoic acid, malonic acid, glutaric acid, glycolic acid, methanesulfonic acid, and toluenesulfonic acid, solid acid catalysts such as cation exchange resins having carboxylic or sulfonic acid groups on the surface, and water-dispersed metal oxide nanoparticles such as acidic water-dispersed silica sol. Alternatively, a dispersion of metal oxide nanoparticles in water or organic solvent such as silica sol may be co-present upon hydrolysis. In case the dispersing medium of the (surface-coated) composite oxide nanoparticle dispersion as component (2-A) is water or a water-soluble organic solvent, it is acceptable to mix water, an acidic hydrolytic catalyst and alkoxysilane in the co-presence of this dispersion so that hydrolytic condensation reaction may take place. This process is advantageous because the dispersion of the (surface-coated) composite oxide nanoparticles in component (2-A) is improved, despite a possibility of partial reaction between surfaces of the (surface-coated) composite oxide nanoparticles in component (2-A) and the hydrolytic condensate of alkoxysilane.

In this hydrolysis, water may be used in an amount of 20 to 3,000 parts by weight per 100 parts by weight of the total of alkoxysilanes (2-B-i), (2-B-ii) and (2-B-iii) and partial hydrolytic condensates thereof. An excess of water may lower system efficiency and in a final coating composition, residual water can adversely affect coating operation and drying. Water is preferably used in an amount of 50 parts by weight to less than 150 parts by weight for the purpose of improving storage stability, mar resistance, and crack resistance. With a smaller amount of water, the silicone resin may fail to reach a weight average molecular weight in the optimum range, as measured by GPC versus polystyrene standards. With an excess of water, the content in the silicone resin of units $R'SiO_{3/2}$ in units $R'SiO_{(3-p)/2}(OB)_p$ derived from component (2-B-ii) may fail to reach the optimum range to maintain a coating crack resistant wherein R' is $R^1$ or $R^2$, B is hydrogen or $R^3$, $R^1$, $R^2$, and $R^3$ are as defined above, and p is an integer of 0 to 3.

Hydrolysis may be effected by adding dropwise or pouring water to the alkoxysilane or partial hydrolytic condensate, or inversely by adding dropwise or pouring the alkoxysilane or partial hydrolytic condensate to water. The reaction system may contain an organic solvent. However, the absence of organic solvent is preferred because there is a tendency that as the reaction system contains more organic solvent, the resulting silicone resin has a lower weight average molecular weight as measured by GPC versus polystyrene standards.

To produce the silicone resin (2-B), the hydrolysis must be followed by condensation. Condensation may be effected continuous to the hydrolysis while maintaining the liquid temperature at room temperature or heating at a temperature of not higher than 100° C. A temperature higher than 100° C. may cause gelation. Condensation may be promoted by distilling off the alcohol formed by hydrolysis at a temperature of at least 80° C. and atmospheric or subatmospheric pressure. Also for the purpose of promoting condensation, condensation catalysts such as basic compounds, acidic compounds or metal chelates may be added. Prior to or during the condensation step, an organic solvent may be added for the purpose of adjusting the progress of condensation or the concentration, or a dispersion of metal oxide nanoparticles in water or organic solvent such as silica sol or the (surface-coated) composite oxide nanoparticle dispersion (2-A) may also be added. For the reason that a silicone resin generally builds up its molecular weight and reduces its solubility in water or alcohol formed as condensation proceeds, the organic solvent added herein should preferably be one having a boiling point of at least 80° C. and a relatively highly polarity in which the silicone resin is fully dissolvable. Examples of the organic solvent include alcohols such as isopropyl alcohol, n-butanol, isobutanol, t-butanol, and diacetone alcohol; ketones such as methyl propyl ketone, diethyl ketone, methyl isobutyl ketone, cyclohexanone, and diacetone alcohol; ethers such as dipropyl ether, dibutyl ether, anisole, dioxane, ethylene glycol monoethyl ether, ethylene glycol monobutyl ether, propylene glycol monomethyl ether, and propylene glycol monomethyl ether acetate; and esters such as propyl acetate, butyl acetate, and cyclohexyl acetate.

The silicone resin resulting from condensation should preferably have a weight average molecular weight (Mw) of at least 1,500, more preferably 1,500 to 50,000, and even more preferably 2,000 to 20,000, as measured by GPC versus polystyrene standards. With a Mw below the range, a coating tends to be less tough and prone to cracking. On the other hand, a silicone resin with too high a Mw tends to have a low hardness and the resins in a coating undergo phase separation, incurring film whitening.

Component (2-C) is a curing catalyst which may be selected from those catalysts commonly used in silicone coating compositions. The curing catalyst serves to promote condensation reaction of condensable groups such as silanol and alkoxy groups in silicone resin (2-B). Suitable catalysts include basic compounds such as lithium hydroxide, sodium hydroxide, potassium hydroxide, sodium methylate, sodium propionate, potassium propionate, sodium acetate, potassium acetate, sodium formate, potassium formate, trimethylbenzylammonium hydroxide, tetramethylammonium hydroxide, tetramethylammonium acetate, n-hexylamine, tributylamine, diazabicycloundecene (DBU), and dicyandiamide; metal-containing compounds such as tetraisopropyl titanate, tetrabutyl titanate, acetylacetonatotitanium, aluminum triisobutoxide, aluminum triisopropoxide, tris(acetylacetonato) aluminum, aluminum diisopropoxy(ethyl acetoacetate), aluminum perchlorate, aluminum chloride, cobalt octylate, (acetylacetonato)cobalt, (acetylacetonato)iron, (acetylacetonato)tin, dibutyltin octylate, and dibutyltin laurate; and acidic compounds such as p-toluenesulfonic acid and trichloroacetic acid. Of these, preference is given to sodium propionate, sodium acetate, sodium formate, trimethylbenzylammonium hydroxide, tetramethylammonium hydroxide, tris(acetylacetonato)aluminum, and aluminum diisopropoxy(ethyl acetoacetate).

Insofar as component (2-C) is compounded in an effective amount to cure the silicone resin (2-B), the amount of the catalyst is not particularly limited. Specifically the curing catalyst is preferably used in an amount of 0.0001 to 30% by weight, more preferably 0.001 to 10% by weight, based on the solids of the silicone resin. Less than 0.0001 wt % of the catalyst may lead to under-cure and low hardness. More than 30 wt % of the catalyst may lead to a coating which is prone to cracking and poorly water resistant.

Component (2-D) is a solvent. The solvent is not particularly limited as long as components (2-A) to (2-C) are dissolvable or dispersible therein. A solvent mainly comprising a highly polar organic solvent is preferred. Exemplary solvents include alcohols such as methanol, ethanol, isopropyl alcohol, n-butanol, isobutanol, t-butanol, and diacetone alcohol; ketones such as methyl propyl ketone, diethyl ketone, methyl isobutyl ketone, cyclohexanone, and diacetone alcohol; ethers such as dipropyl ether, dibutyl ether, anisole, dioxane, ethylene glycol monoethyl ether, ethylene glycol monobutyl ether, propylene glycol monomethyl ether, and propylene glycol monomethyl ether acetate; and esters such as ethyl acetate, propyl acetate, butyl acetate, and cyclohexyl acetate. The solvents may be used alone or in admixture.

Component (2-D) is preferably added in such an amount that the silicone coating composition may have a solids concentration of 1 to 30% by weight, more preferably 5 to 25% by weight. Outside the range, a coating obtained by applying the composition and curing may be defective. A concentration below the range may lead to a coating which is likely to sag, wrinkle or mottle, failing to provide the desired hardness and mar resistance. A concentration beyond the range may lead to a coating which is prone to brushing, whitening or cracking.

The silicone resin (2-B) may contain colloidal silica. Particularly when it is desired to enhance the hardness and mar resistance of a coating, an appropriate amount of colloidal silica may be added. It is a colloidal dispersion of nano-size silica having a particle size of about 5 to 50 nm in a medium such as water or organic solvent. Commercially available water-dispersed or organic solvent-dispersed colloidal silica may be used herein. Examples include Snowtex-O, OS, OL and Methanol Silica Sol by Nissan Chemical Industries Ltd. The colloidal silica is preferably compounded in an amount of 0 to 40% by weight based on the silicone resin (2-B). When used, the colloidal silica is preferably compounded in an amount of at least 2% by weight based on the silicone resin (2-B).

If desired, suitable additives may be added to the silicone coating composition of which lower layer (II) is formed, insofar as this does not adversely affect the invention. Suitable additives include pH adjustors, leveling agents, thickeners, pigments, dyes, metal oxide nanoparticles, metal powder, antioxidants, UV absorbers, UV stabilizers, heat ray reflecting/absorbing agents, plasticizers, antistatic agents, antistaining agents, and water repellents.

For enhanced storage stability, the silicone coating composition of which lower layer (II) is formed may preferably be adjusted to pH 2 to 7, more preferably pH 3 to 6. Since a pH value outside the range may lessen storage stability, a pH adjustor may be added so that the pH falls in the range. For a silicone coating composition having a pH value outside the range, if the pH is more acidic than the range, a basic compound such as ammonia or ethylene diamine may be added for pH adjustment. If the pH is more basic than the range, an acidic compound such as hydrochloric acid, nitric acid, acetic acid or citric acid may be added for pH adjustment. The pH adjustment method is not particularly limited.

When the substrate is made of an organic resin, a UV absorber, UV stabilizer or a combination of UV absorber and UV stabilizer other than component (2-A) may be added to a cured film of the silicone coating composition of which lower layer (II) is formed, for the purpose of preventing the substrate from yellowing or surface degradation. The UV absorber, UV stabilizer or a combination of UV absorber and UV stabilizer which is compatible with the silicone coating composition and low volatile is preferred.

Examples of the UV absorber include well-known inorganic oxides such as cerium oxide and zirconium oxide, excluding the (surface-coated) composite oxide nanoparticles as component (2-A), and those oxides having controlled photocatalytic activity are preferred for further enhancing the UV shielding function. Metal chelate compounds of titanium, zinc, and zirconium and (partial) hydrolyzates and condensates thereof are also useful. Preferred organic examples include derivatives of compounds having hydroxybenzophenone, benzotriazole, cyanoacrylate and triazine as a main skeleton. Also included are polymers such as vinyl polymers having the UV absorber incorporated in a side chain and copolymers thereof with another vinyl monomer, and silyl-modified UV absorbers, and (partial) hydrolytic condensates thereof.

Exemplary UV absorbers include 2,4-dihydroxybenzophenone, 2,2',4,4'-tetrahydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-t-methylphenyl)benzotriazole, 2-(2-hydroxy-5-t-octylphenyl)benzotriazole, 2-(2-hydroxy-3,5-di-t-butylphenyl)benzotriazole, ethyl-2-cyano-3,3-diphenyl acrylate, 2-ethylhexyl-2-cyano-3,3'-diphenyl acrylate, 2-(2-hydroxy-4-hexyloxyphenyl)-4,6-diphenyltriazine, (co)polymers of 2-hydroxy-4-(2-acryloxyethoxy)benzophenone, (co)polymers of 2-(2'-hydroxy-5'-methacryloxyethylphenyl)-2H-benzotriazole, the reaction product of 2,4-dihydroxybenzophenone with γ-glycidoxypropyltrimethoxysilane, the reaction product of 2,2',4,4'-tetrahydroxybenzophenone with γ-glycidoxypropyltrimethoxysilane, and (partial) hydrolyzates thereof. These organic UV absorbers may be used alone or in admixture.

The UV absorber is preferably compounded in an amount of 0 to 100% by weight, and when used, in an amount of more preferably 0.3 to 100%, even more preferably 0.3 to 30% by weight based on the solids in the silicone coating composition.

Preferred as the UV stabilizer are compounds having at least one cyclic hindered amine structure in a molecule, which are compatible with the silicone coating composition and low volatile. Exemplary UV stabilizers include 3-dodecyl-1-(2,2,6,6-tetramethyl-4-piperidinyl)pyrrolidine-2,5-dione, N-methyl-3-dodecyl-1-(2,2,6,6-tetramethyl-4-piperidinyl)pyrrolidine-2,5-dione, N-acetyl-3-dodecyl-1-(2,2,6,6-tetramethyl-4-piperidinyl)pyrrolidine-2,5-dione, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidyl) 1,2,3,4-butane-tetracarboxylate, tetrakis(1,2,2,6,6-pentamethyl-4-piperidyl) 1,2,3,4-butane-tetracarboxylate, the condensate of 1,2,3,4-butanetetracarboxylic acid, 2,2,6,6-tetramethyl-4-piperidinol and tridecanol, 8-acetyl-3-dodecyl-7,7,9,9-tetramethyl-1,3,8-triazaspiro[4,5]decane-2,4-dione, the condensate of 1,2,3,4-butanetetracarboxylic acid, 1,2,6,6-pentamethyl-4-piperidinol and β,β,β,β'-tetramethyl-3,9-(2,4,8,10-tetraoxaspiro[5,5]undecane)diethanol, and the condensate of 1,2,3,4-butanetetracarboxylic acid, 2,2,6,6-pentamethyl-4-piperidinol and β,β,β,β'-tetramethyl-3,9-(2,4,8,10-tetraoxaspiro[5,5]undecane)diethanol. Also useful are photostabilizers which are modified by silylation for the purpose of anchoring the photostabilizers as described in JP-B S61-56187, for example, 2,2,6,6-tetramethylpiperidino-4-propyltrimethoxysilane, 2,2,6,6-tetramethylpiperidino-4-propylmethyldimethoxysilane, 2,2,6,6-tetramethylpiperidino-4-propyltriethoxysilane, 2,2,6,6-tetramethylpiperidino-4-propylmethyldiethoxysilane, and (partial) hydrolyzates thereof. These photostabilizers may be used in admixture of two or more.

The UV stabilizer is preferably compounded in an amount of 0 to 10% by weight, and when used, in an amount of more preferably 0.03 to 10%, even more preferably 0.03 to 7.5% by weight based on the solids in the silicone coating composition.

The silicone coating composition may be applied to the substrate or bottom layer (III) by any ordinary coating techniques. Suitable coating techniques include brush coating, spray coating, dipping, flow coating, roll coating, curtain coating, spin coating, and knife coating.

After the silicone coating composition is applied, the coating may be air dried or heated to form a cured layer as lower layer (II). The curing temperature and time are not particularly limited although the coating is preferably heated at a temperature below the heat resistant temperature of the substrate for 10 minutes to 2 hours. More preferably the coating is heated at a temperature of 80 to 135° C. for 30 minutes to 2 hours.

The thickness of the cured film as lower layer (II) is not particularly limited and may be selected as appropriate for a particular application. The cured film preferably has a thickness of 0.1 to 50 µm, and more preferably in the range of 1 to 20 µm for ensuring that the cured film has hardness, mar resistance, long-term stable adhesion and crack resistance.

Outermost Layer I

In a preferred embodiment, the outermost layer is deposited using a low pressure, ETP deposition process. Plasma is generated in ETP processes by ionizing a noble gas, such as Ar or He, through a DC arc generator. The plasma expands into a low-pressure chamber, where vaporized organosilicon material is injected. Examples of organosilicon materials include octamethylcyclotetrasiloxane (D4), decamethylcyclopentasiloxane (D5), tetravinyltetramethylcyclotetrasiloxane (V-D4), tetramethyldisiloxane (TMDSO), dimethyldimethoxysilane (DMDMS), hexamethyldisiloxane (HMDSO), and binyltrimethylsilane (VTMS). The plasma species react with the organosilicon gas to produce dissociated molecules, which are pre-cursors of the deposited film. Oxidizing gas may be added to the chamber to react with the dissociated reactant molecules.

The coating chamber is a continuous, two-sided coating process consisting of a heating station and two coating stations to deposit an inner sub-layer and an outer sub-layer. The coating stations consist of arrays of DC plasma arc generators on both sides to coat the entire window surface. The rate of deposition ranges from at least 200 nm/min up to 10,000 nm/min. The number of plasma arc generators in an array can be scaled up to completely coat large area windows.

The reactants consist of the $Ar^+$ ions emitted from the plasma arc generators, the organosilicon vapor, and the oxidizing agent. The relative amounts of those 3 components are varied to achieve desired coating properties, including composition, which is correlated to the refractive index of the coating. In a preferred embodiment, organosilicon is D4 and the oxidizing agent is $O_2$. In such a system, the reactants can be varied in the ranges of $Ar^+$: 4 to 88%, D4: 6 to 71%, and $O_2$: 0 to 86%. The resulting coatings have composition of $SiC_xO_yH_z$. Regarding the atomic levels of Si, C, and O, the percent of Si is approximately 37% and the ratio of C/0 ranges from 0.3 to 1.0.

In a preferred embodiment, inner sub-layer has a refractive index in the range of 1.445 to 1.493 and the outer sub-layer has a refractive index in the range of 1.430 to 1.456. More preferably, the outer sub-layer has a refractive index in the range of 1.430 to 1.435. Also preferably, the inner sub-layer has a nano-indentation hardness in the range of 1.123 to 1.366 GPa and the outer sub-layer has a nano-indentation hardness in the range of 1.345 to 1.449 GPa. Typically, the outermost layer (I) has a total thickness in the range of 2.5 to 4.5 µm, and more preferably 3.0 to 4.5 µm.

The laminate of the invention is characterized by mar resistance. An index of mar resistance is a delta haze value (ΔHz) in the Taber abrasion test. Specifically, a ΔHz value is determined according to ASTM D1044 by mounting a Taber abrasion tester with abrasion wheels SC-10F, measuring the haze after 1,000 turns under a load of 500 g, and calculating a difference (ΔHz) between haze values before and after the test. The laminate preferably has ΔHz of up to 5.0%, more preferably up to 3.0%, and even more preferably less than 2.0%.

The laminate of the invention is also characterized by adhesion. An index of adhesion is given by the adhesion test of ASTM D870. The laminate has good adhesion when the area of coating sections which are kept unpeeled in the test is at least 97%.

The laminate of the invention is further characterized by weather resistance. An index of weather resistance is given by a weathering test to see whether or not a coating is kept intact, that is, whether or not a coating is cracked or peeled, and also whether or not a laminate is yellowed. To examine the development of cracks in a coating, the weathering test is carried out by using Eyesuper UV tester W-151 (Iwasaki Electric Co., Ltd.), and repeating cycles consisting of [black panel temperature 63° C., humidity 50% RH, illuminance 50 mW/cm², raining intervals of 10 sec/hour for 5 hours] and [black panel temperature 30° C., humidity 95% RH for one hour]. Those samples whose coating undergoes neither cracking nor peeling or whose substrate undergoes no yellowing after 40 cycles, preferably after 70 cycles, and more preferably after 90 cycles are regarded as passing the test.

EXAMPLE

Synthesis Examples, Examples and Comparative Examples are given below by way of illustration and not by way of limitation. Unless otherwise stated, all parts and percents are by weight. The viscosity is as measured at 25° C. according to JIS Z8803. Mw denotes a weight average molecular weight as determined by gel permeation chromatography (GPC) using polystyrene standards.

[(2-A) Surface-Coated Composite Oxide Nanoparticle Dispersion]

Dispersions of surface-coated composite oxide nanoparticles as shown below were used as a UV shielding agent.

A-1: ZNTANB 15 wt %-E16(2) by C.I. Kasei Co., Ltd. (a dispersion obtained by applying silica to zinc oxide nanoparticles prepared by DC arc plasma method, surface treating them with methyltrimethoxysilane, and dispersing them in an alcohol mixture with the aid of a dispersant, solids concentration: 15%, particle size distribution measured by Nanotrac UPA-EX150 (Nikkiso Co., Ltd.): FIG. 1, average particle size (volume average particle size $D_{50}$): 105 nm)

A-2: RTTDNB 15 wt %-E68 by C.I. Kasei Co., Ltd. (a dispersion obtained by applying silica to titanium oxide nanoparticles prepared by DC arc plasma method, and dispersing them in an alcohol mixture with the aid of a dispersant, solids concentration: 15%, average particle size (volume average particle size $D_{50}$): 99 nm)

[Measurement of Photocatalytic Activity of Oxide Nanoparticle Dispersion]

An amount of the surface-coated composite oxide nanoparticle dispersion A-1 or A-2 to provide 0.15 g of oxide nanoparticle solids was added to 20 g of a methylene blue solution in water/methanol (1:1 weight ratio) having a methylene blue concentration of 0.01 mmol/L. The solution was stirred in the dark for 30 minutes, and then irradiated with black light of 15 W for 12 hours. Thereafter, the solution was centrifuged at 3,000 rpm for 15 minutes to collect the supernatant, and the absorbance of methylene blue at 653 nm was measured by a UV/visible spectrophotometer. A photocatalytic degradability (PD) was computed from the absorbances before and after the black light irradiation according to the following formula:

$$PD (\%) = [(A_0 - A)/A_0] \times 100$$

wherein $A_0$ is the initial absorbance and A is the absorbance after the black light irradiation. The results are shown in Table 1.

[Synthesis of Silicone Coating Composition (II)]

Synthesis Example 1

A 2-L flask was charged with 287 g (2.11 Si-mol) of methyltrimethoxysilane and cooled to a fluid temperature of about 10° C. Then 211 g of Snowtex O (Nissan Chemical Industries, Ltd., water-dispersed silica sol, average particle size 15-20 nm, $SiO_2$ content 20%) and 93 g of 0.25N acetic acid aqueous solution were added dropwise while the flask was cooled so that the internal temperature might not exceed 40° C., allowing hydrolysis to run. Following the dropwise addition, the solution was stirred below 40° C. for one hour and then at 60° C. for 3 hours to bring hydrolysis to completion.

Thereafter, 300 g of cyclohexanone was poured to the reaction mixture, which was heated under atmospheric pressure until the liquid temperature reached 92° C., for distilling off the methanol resulting from hydrolysis and allowing condensation to run. To the reaction mixture were added 400 g of isopropanol as a diluent, 1.6 g of acetic acid, and 1.6 g of 25% tetramethylammonium hydroxide (TMAH) aqueous solution. The mixture was stirred and filtered through a paper filter, yielding a colorless clear silicone resin solution having a nonvolatile concentration of 19.2%, a Mw of 2,510, and a polydispersity index of 1.84.

To 100 parts as solids of the silicone resin solution were added 26.7 parts of nanoparticle dispersion A-1, and 0.014 part of a polyether-modified silicone KP-341 (Shin-Etsu Chemical Co., Ltd.) as a leveling agent for smoothing a coating surface. Stirring yielded a silicone coating composition (II-a).

Synthesis Examples 2 to 9

Eight silicone coating compositions (II-b) to (II-i) were prepared as in Synthesis Example 1 except that the type and amount of surface-coated composite oxide nanoparticle dispersion and the amount of leveling agent were changed as shown in Table 2.

[Synthesis of Compound Having Nitrogen and Alkoxysilyl in Molecule]

Synthesis Example 10

A 2-L flask equipped with a stirrer, condenser and thermometer was charged with 222 g of N-2-(aminoethyl)-3-aminopropyltrimethoxysilane and 242 g of hexamethyldisilazane as a silylating agent, which were heated at 120° C. under a nitrogen stream. To the contents, 496 g of γ-glycidoxypropylmethyldiethoxysilane was added dropwise for reaction, followed by stirring and heating at 120° C. for 5 hours. The low-boiling fraction was distilled off under vacuum at 100° C., yielding 862 g of a viscous compound having a viscosity of 1,387 cS, a refractive index of 1.4618, and a specific gravity of 1.048.

Then, a 2-L flask equipped with a stirrer, condenser and thermometer was charged with 862 g of this reaction product and 862 g of toluene. Under a nitrogen stream, 141 g of acetic anhydride was added dropwise to the contents at room temperature, followed by stirring and heating at 110° C. for 2 hours. Then 141 g of methanol was added dropwise to the mixture at 50° C., followed by stirring and heating at 50° C. for one hour. The low-boiling fraction was distilled off under vacuum at 100° C., yielding a reddish brown, clear, highly viscous compound.

This compound was analyzed by infrared absorption spectroscopy. While no absorption peaks assigned to OH or NH group were found in the region of 3,000 $cm^{-1}$ or greater, a strong absorption peak assigned to amide group was found at 1,650 $cm^{-1}$.

The compound was diluted with propylene glycol monomethyl ether (PGM) to a nonvolatile content of 25% (as measured according to JIS K6833), giving a solution of a compound having nitrogen and alkoxysilyl in a molecule, designated NSi-1.

[Synthesis of Primer Composition of Vinyl Polymer Having Organic UV Absorptive Group and Alkoxysilyl Group Bonded to Side Chains]

Synthesis Example 11

A 2-L flask equipped with a stirrer, condenser and thermometer was charged with 152 g of diacetone alcohol, which was heated at 80° C. under a nitrogen stream. A monomer mix solution was previously prepared by mixing 67.5 g of 2-[2'-hydroxy-5'-(2-methacryloxyethyl)phenyl]-2H-benzotriazole (RUVA-93, Otsuka Chemical Co., Ltd.), 90 g of γ-methacryloxypropyltrimethoxysilane, 270 g of methyl methacrylate, 22.5 g of glycidyl methacrylate, and 350 g of diacetone alcohol. An initiator solution was previously prepared by dissolving 2.3 g of 2,2'-azobis(2-methylbutyronitrile) as a polymerization initiator in 177.7 g of diacetone alcohol. A 240 g portion of the monomer mix solution and a 54 g portion of the initiator solution were sequentially admitted into the flask, which was heated at 80° C. for 30 minutes, allowing reaction to run. The remainder of the monomer mix solution and the remainder of the initiator solution were concurrently added dropwise at 80-90° C. over 1.5 hours, followed by stiffing at 80-90° C. for 5 hours.

The resulting vinyl polymer having organic UV absorptive group and trimethoxysilyl group bonded to side chains had a viscosity of 5,050 mPa-s, and this copolymer contained 15% of the UV absorbing monomer and 20% of the vinyl monomer having a trimethoxysilyl group bonded to a side chain via a C—Si bond. The polymer had a Mw of 60,800 as measured by GPC.

To 100 parts as solids of the resulting vinyl polymer were added 32 parts of a thermoplastic acrylic resin Elvasite 2041 (Lucite International) and 29 parts of the nitrogen/alkoxysilyl-containing compound NSi-1 (synthesized in Synthesis Example 10) as a crosslinker. The mixture was diluted with a solvent mixture of diacetone alcohol and propylene glycol monomethyl ether (in a weight ratio 1/1), thoroughly stiffed, and filtered through a paper filter, yielding a yellow clear primer composition (III-a) having a nonvolatile concentration of 10.4%.

Synthesis Example 12

A 2-L flask equipped with a stirrer, condenser and thermometer was charged with 338 g of methyltrimethoxysilane, which was kept at 20° C. with stirring. Then 98 g of Snowtex O (Nissan Chemical Industries, Ltd., water-dispersed colloidal silica, average particle size 15-20 nm, $SiO_2$ content 20%) and 230 g of 0.25N acetic acid aqueous solution were added, followed by stiffing for 3 hours. The mixture was stirred at 60° C. for a further 3 hours, after which 300 g of cyclohexanone was added, and the by-product methanol was distilled off under atmospheric pressure. The reaction mixture was combined with 300 g of isopropanol and 134 g of an isopropanol solution of 0.25% tetrabutylammonium hydroxide and diluted with isopropanol to a nonvolatile content of 20% (according to JIS K6833). The resulting organopolysiloxane solution had a viscosity of 4.1 $mm^2/s$ and a Mw of 2,500 as measured by GPC.

To 100 parts as solids of the vinyl polymer (synthesized in Synthesis Example 11) were added 18 parts of the organopolysiloxane solution obtained herein and 98 parts of a solvent mixture of diacetone alcohol and propylene glycol monomethyl ether (in a weight ratio 1/1). The mixture was thoroughly stirred and filtered through a paper filter, yielding a colorless clear primer composition (III-b) having a nonvolatile concentration of 20.4%.

[Preparation and Evaluation of Laminate]

Example 1

Each of primer compositions (III-a) and (III-b) in Synthesis Examples 11 and 12 was flow coated onto a cleaned surface of a Lexan® polycarbonate panel (150 mm by 150 mm by 5 mm thick) and heat cured at 130° C. for 60 minutes to form a cured film of about 7 to 9 μm thick. Each of silicone coating compositions (II-a) to (II-i) in Synthesis Examples 1 to 9 was flow coated onto the primer coating and heat cured at 130° C. for 60 minutes to form a cured film of about 3 to 5 μm thick. Subsequently, a coating composed of silicon, oxygen, carbon and hydrogen was deposited on the silicone coating by plasma polymerization, yielding a laminate.

A laminate was constructed from a molded Lexan® polycarbonate panel, a cured film of the silicone coating composition, and an overlying scratch/mar resistant layer. The scratch/mar resistant layer was formed on the cured film of the silicone coating composition using the prior art method (S. M. Gasworth et al., "Layered article with improved microcrack resistance and method of making", U.S. Pat. No. 6,376, 064, Aug. 7, 2000), but this attempt did not result in acceptable adhesion. Thus, a new scratch/mar resistant layer was developed in order to meet the adhesion and mar resistance requirements. This layer was formed by plasma polymerization of vaporized D4 and $O_2$ gas, so that it contained silicon, oxygen, carbon and hydrogen.

Before plasma polymerization, the substrate with a cured film of the silicone coating composition was cleaned by manual operation using an isopropyl alcohol/deionized water-drenched lint-free cloth. Plasma polymerization was then carried out in a vacuum chamber by the continuous, 2-sided expanding thermal plasma process (C. D. Iacovangelo et al., "Expanding thermal plasma deposition system", US Patent Application 2005/0202184, Mar. 8, 2005). Two plasma coating stations consisted of arrays of expanding thermal plasma sources that created argon plasma jets at supersonic speeds. The plasma jets expanded into the plasma coating stations and reacted with an organosilicon reagent and oxidizing agent that were injected directly into the chamber. The substrate was continuously transported through the chamber at a linear speed of 2.0 cm/s and heated to approximately 70° C. before entering the coating stations.

Variables of the plasma process included the energy of plasma source, flow rate of argon gas, flow rate of organosilicon reagent, flow rate of oxidizing agent, and process pressure in the range of about 30 to 70 mTorr. These process variables were adjusted so as to form a solid layer with specific chemical and physical properties. The coating properties were used as factors to create the experimental design with targeted levels to determine their effects on coating performance.

The plasma-polymerized layer properties used as factors in the experimental design included refractive index of each sub-layer, nano-indentation hardness of each sub-layer, and total thickness. The experimental design also incorporated properties of the cured film of a silicone coating composition, including ultraviolet absorber (UVA) content, surface leveling agent, film thickness, coating type, and UVA type. All factors were analyzed to determine the main effects of each and the interaction effects on adhesion and Taber abrasion resistance. Adhesion was tested by the cross-hatch tape pull test (ASTM D870) at the initial stage and after immersion in deionized water at 65° C. for 3 days, and quantified by percent retention of the coating system on the polycarbonate substrate. Taber abrasion resistance was analyzed by an increase in haze after 1000 cycles of Taber abrasion by a pair of CS10F wheels under a load of 500 g per wheel (ASTM D1044).

Statistical analysis included linear effects of each factor as well as the interaction effects between the factors. Table 3 contains the results of the analysis, showing the factors that exhibited main effects (ME) and interaction effects (IE) on adhesion and Taber abrasion. In the cases of interaction effects, the other factor that interacted with the given factor is indicated in the box.

Coating properties and interaction effects of the properties of both the cured film of silicone coating composition and the scratch/mar resistant layers contributed to adhesion and Taber abrasion results. The presence of surface leveling agent in the cured film of silicone coating composition is preferred for improving the coating thickness and optical appearance. However, high loading of surface leveling agent tended to produce poor adhesion, while ⅓ fraction of the standard amount was acceptable. With ⅓ fraction of standard of surface leveling agent, the standard content of UVA (level=1) achieved passing adhesion. In addition, lower refractive index and higher plasma layer thickness lowered the Taber ΔHz. The preferred values of factors produced passing adhesion (97-100%) and Taber ΔHz<2%.

Examples 2 to 7

Of the laminates produced in Example 1, those laminates produced under plasma polymerization conditions that provided acceptable adhesion and adequate values of ΔHz in the Taber abrasion test were further evaluated by the following tests, with the results shown in Table 4.

Comparative Examples 1 to 4

Laminates were produced by the same procedure as in Example 1 aside from using primer composition (III-a) of Synthesis Example 11 and silicone coating compositions (II-a) and (II-h) of Synthesis Examples 1 and 8. The laminates were evaluated by the following tests, with the results shown in Table 5.

[Evaluation of Cured Films]
Transparency or Haze (Hz)

A laminate sample was measured for haze by a haze meter NDH2000 (Nippon Denshoku Industries Co., Ltd.).

Mar Resistance (ΔHz)

Mar resistance was analyzed according to ASTM D1044 by mounting a Taber abrasion tester with wheels CS-10F, measuring a haze after 1000 cycles under a load of 500 g, and calculating a haze difference (ΔHz) before and after the test.

Initial Adhesion

Adhesion was analyzed by a cross-hatch adhesion test according to ASTM D870, specifically by scribing the laminate with a razor along 11 longitudinal and 11 transverse lines at a spacing of 1 mm to define 100 square sections, tightly attaching adhesive tape (Cellotape by Nichiban Co., Ltd.) thereto, rapidly pulling back the adhesive tape at an angle of 90°, and calculating the percent area of coating sections kept unpeeled.

Adhesion after Water Immersion

The laminate was immersed in deionized water at 65° C. for 3 days before it was examined by the adhesion test.

Weather Resistance

A weathering test was carried out by Eyesuper UV tester W-151 (Iwasaki Electric Co., Ltd.) which operated one cycle of [black panel temperature 63° C., humidity 50% RH, illuminance 50 mW/cm$^2$, raining intervals of 10 sec/hour for 5 hours] and [black panel temperature 30° C., humidity 95% RH for one hour]. The test repeated 40 cycles, 70 cycles, and 90 cycles. A yellowing index (YI) was measured according to JIS K7103 before and after the test, from which a change of yellowing index (ΔYI) was computed. The weathered laminate was also examined for cracks and delamination with naked eyes or under a microscope (250× magnifying power).

Crack

The coating appearance after the weathering test was rated according to the following criterion.

○: intact
Δ: some cracks
x: cracks on entire coating

Delamination

The coating after the weathering test was rated according to the following criterion.

○: intact
Δ: some delamination
x: overall delamination

TABLE 1

| Photocatalytic activity of surface-coated composite oxide nanoparticles | | | |
|---|---|---|---|
| Surface-coated composite oxide nanoparticle dispersion | Blank | A-1 | A-2 |
| Initial absorbance @ 653 nm | 1.275 | — | — |
| Absorbance @ 653 nm after 12 hr irradiation | — | 0.999 | 1.137 |
| Photocatalytic degradability, % | — | 21.6 | 10.8 |

TABLE 2

| | Formulation (as solids) of silicone coating composition | | | | | | | | |
|---|---|---|---|---|---|---|---|---|---|
| Amount | Synthesis Example | | | | | | | | |
| (pbw) | 1 | 2 | 3 | 4 | 5 | 6 | 7 | 8 | 9 |
| Silicone coating composition | II-a | II-b | II-c | II-d | II-e | II-f | II-g | II-h | II-i |
| Surface-coated composite oxide nanoparticle dispersion | A-1 26.7 pbw (20% NV) | A-1 26.7 pbw (20% NV) | A-1 26.7 pbw (20% NV) | A-1 40 pbw (30% NV) | A-1 40 pbw (30% NV) | A-2 2.7 pbw (2% NV) | A-2 2.7 pbw (2% NV) | — | — |
| Silicone resin solution | 100 pbw | 100 pbw | 100 pbw | 100 pbw | 100 pbw | 100 pbw | 100 pbw | 100 pbw | 100 pbw |
| Leveling agent KP-341 (relative ratio provided 0.05 pbw = 1) | 0.014 pbw (1/3) | — (0) | 0.05 pbw (1) | 0.014 pbw (1/3) | — (0) | 0.014 pbw (1/3) | — (0) | 0.014 pbw (1/3) | 0.05 pbw (1) |

TABLE 3

| Factors that affect adhesion and taber | | | | | |
|---|---|---|---|---|---|
| | | Responses: ME (main effect)/ IE (interaction effect) | | | |
| Factors | | Adhesion/ 130 Tests | | Taber | |
| Factor | Tested values | Initial 70-100% | 3-day WI 15-100% | Haze 1.3-3.7% | Preferred values |
| A: UVA content (A-1 content, %) | 0, 20, 30 | ME, IE (with B) | ME, IE (with B) | | 20 |
| B: Leveling agent | 0, 1/3, 2/3, 1 | IE (with A) IE (with D) | IE (with A) | ME | 1/3 |

TABLE 3-continued

Factors that affect adhesion and taber

| Factor | Tested values | Responses: ME (main effect)/ IE (interaction effect) Adhesion/ 130 Tests Initial 70-100% | 3-day WI 15-100% | Taber Haze 1.3-3.7% | Preferred values |
|---|---|---|---|---|---|
| C: Primer thickness (μm) | 4.5, 7, 9 | | | | 4.5, 7, 9 |
| D: Refractive index of inner plasma sub-layer | 1.445-1.493 | ME, IE (with B) | ME | | 1.445-1.493 |
| E: Refractive index of outer plasma sub-layer | 1.430-1.456 | | | ME | 1.430-1.435 |
| F: Nano-indentation hardness of inner plasma sub-layer (GPa) | 1.123-1.366 | | | | 1.123-1.366 |
| G: Nano-indentation hardness of outer plasma sub-layer (GPa) | 1.345-1.449 | | | | 1.345-1.449 |
| H: Primer type | III-a, III-b | | | | III-a, III-b |
| J: UVA type | none, A-1, A-2 | ME | ME | | A-1, A-2 |
| K: Plasma total thickness (μm) | 2.5-4.5 | | | ME | 3.0-4.5 |

TABLE 4

Test results of laminate

| Coating system | Example 2 | 3 | 4 | 5 | 6 | 7 |
|---|---|---|---|---|---|---|
| Primer composition | III-a | III-a | III-a | III-b | III-a | III-a |
| Film thickness, μm | 9 | 9 | 9 | 7 | 9 | 9 |
| Silicone coating composition | II-a | II-d | II-e | II-a | II-f | II-g |
| Film thickness, μm | 3 | 3 | 3 | 3 | 3 | 3 |
| Plasma-polymerized film Film thickness, μm | 3.5 | 3.5 | 3.5 | 3.5 | 3.5 | 3.5 |
| Refractive index of sub-layer on lower layer (II) side | 1.470 | 1.493 | 1.470 | 1.470 | 1.457 | 1.470 |
| Refractive index of sub-layer on surface side | 1.431 | 1.456 | 1.431 | 1.431 | 1.435 | 1.431 |
| Indentation hardness of sub-layer on lower layer (II) side, GPa | 1.426 | 1.345 | 1.426 | 1.426 | 1.449 | 1.426 |
| Indentation hardness of sub-layer on surface side, GPa | 1.356 | 1.123 | 1.356 | 1.356 | 1.366 | 1.356 |
| Transparency Hz, % | 2.9 | 3.0 | 3.0 | 2.7 | 2.7 | 2.9 |
| Mar resistance ΔHz, % | 1.9 | 3.4 | 2.0 | 1.3 | 2.6 | 1.8 |
| Initial adhesion, % | 100 | 98 | 99 | 100 | 100 | 100 |
| Adhesion after water immersion 65° C./3 days, % | 99 | 89 | 98 | 98 | 98 | 99 |
| Weathering test @40 cycles ΔYI | 0.56 | 0.86 | 0.59 | −0.21 | 0.33 | 0.29 |
| Crack | ○ | ○ | ○ | ○ | ○ | ○ |
| Delamination | ○ | ○ | ○ | ○ | ○ | ○ |
| Weathering test @70 cycles ΔYI | 0.59 | 0.99 | 0.66 | 0.91 | 1.00 | 1.12 |
| Crack | ○ | ○ | ○ | ○ | ○ | ○ |
| Delamination | ○ | ○ | ○ | ○ | ○ | ○ |
| Weathering test @90 cycles ΔYI | 0.65 | 1.00 | 0.54 | 2.22 | 16.02 | 21.85 |
| Crack | ○ | ○ | ○ | ○ | ○ | ○ |
| Delamination | ○ | ○ | ○ | ○ | ○ | x |

TABLE 5

Test results of laminate

| | Comparative Example | | | |
|---|---|---|---|---|
| | 1 | 2 | 3 | 4 |
| Coating system | | | | |
| Primer composition | III-a | III-a | III-a | III-a |
| Film thickness, μm | 4.5 | 9 | 9 | 9 |
| Silicone coating composition | II-h | II-h | II-a | II-h |
| Film thickness, μm | 3 | 3 | 3 | 3 |
| Plasma-polymerized film | | | | |
| Film thickness, μm | 3.5 | 3.5 | — | — |
| Refractive index of sub-layer on lower layer (II) side | 1.470 | 1.470 | — | — |
| Refractive index of sub-layer on surface side | 1.431 | 1.431 | — | — |
| Indentation hardness of sub-layer on lower layer (II) side, GPa | 1.426 | 1.426 | — | — |
| Indentation hardness of sub layer on surface side, GPa | 1.356 | 1.356 | — | — |
| Test results of laminate | | | | |
| Transparency Hz, % | 1.0 | 2.2 | 0.9 | 0.5 |
| Mar resistance ΔHz, % | 1.9 | 1.8 | 17.1 | 14.7 |
| Initial adhesion, % | 100 | 99 | 100 | 100 |
| Adhesion after water immersion 65° C./3 days, % | 100 | 100 | 99 | 100 |
| Weathering test @ 40 cycles ΔYI | 15.45 | 0.26 | 0.56 | 0.19 |
| Crack | ○ | ○ | ○ | ○ |
| Delamination | × | ○ | ○ | ○ |
| Weathering test @ 70 cycles ΔYI | | 17.69 | 0.59 | 19.74 |
| Crack | | ○ | ○ | × |
| Delamination | | × | ○ | × |
| Weathering test @ 90 cycles ΔYI | | | 0.65 | |
| Crack | | | ○ | |
| Delamination | | | ○ | |

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to d one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The invention claimed is:

1. An organic resin laminate having UV-shielding property and high mar resistance at a surface, comprising an organic resin substrate and a multilayer coating system on a surface of the substrate,
the multilayer coating system including an outermost layer (I) which is a hard film resulting from plasma polymerization of an organosilicon compound and a lower layer (II) disposed contiguous to the outermost layer which is a cured film of a silicone coating composition,
said silicone coating composition comprising
(2-A) composite oxide nanoparticles obtained by coating surfaces of zinc oxide nanoparticles, titanium oxide nanoparticles or a combination thereof with a member selected from the group consisting of oxides and hydroxides of Al, Si, Zr and Sn and having no photocatalytic activity or a photocatalytic degradability of up to 25%, wherein the photocatalytic degradability (PD) is determined by irradiating black light to a methylene blue solution having said composite oxide nanoparticles uniformly dispersed therein for 12 hours, measuring the absorbance of the solution at 653 nm before and after the black light irradiation, and calculating according to the following formula:

PD (%)=[($A_0$-A)/$A_0$]×100 wherein $A_0$ is the initial absorbance and A is the absorbance after the black light irradiation,
(2-B) a silicone resin obtained by (co)hydrolyzing, condensing or (co)hydrolyzing-condensing a member selected from alkoxysilanes and partial hydrolytic condensates thereof, said alkoxysilane having the following general formula (1):

$$(R^1)_m(R^2)_n Si(OR^3)_{4-m-n} \quad (1)$$

wherein $R^1$ and $R^2$ are each independently hydrogen or a substituted or unsubstituted monovalent hydrocarbon group, and $R^1$ and $R^2$ may bond together, $R^3$ is an alkyl group having 1 to 3 carbon atoms, and m and n are independently 0 or 1 and m+n is 0, 1 or 2,
(2-C) a curing catalyst, and
(2-D) a solvent,
the solids content of composite oxide nanoparticle dispersion (2-A) being 1 to 50% by weight based on the solids content of silicone resin (2-B).

2. The laminate of claim 1, wherein the outermost layer (I) is a hard coating obtained from plasma polymerization and oxidation of an organosilicon compound and comprising silicon, oxygen, carbon and hydrogen.

3. The laminate of claim 1, wherein the outermost layer (I) includes an inner sub-layer and an outer sub-layer, properties of the sub-layers being adjusted so as to achieve adhesion to the lower layer (II) and to impart mar resistance to the coating system.

4. The laminate of claim 1, wherein the outermost layer (I) has a total thickness in the range of 2.5 to 4.5 μm.

5. The laminate of claim 1, wherein the properties of the outermost layer (I) and lower layer (II) are predetermined such that the laminate exhibits a pass rate of at least 97% in the adhesion test of ASTM D870 and a delta haze value of less than 2% in the Taber abrasion test of ASTM D1044.

6. The laminate of claim 1, wherein the lower layer (II) has a transmittance at wavelength 370 nm of up to 80% when measured as a cured film of 0.5 to 3 μm thick on a quartz plate.

7. The laminate of claim 1, wherein the composite oxide nanoparticles (2-A) have been further surface-treated with a member selected from hydrolyzable silanes and partial hydrolytic condensates thereof, said hydrolyzable silane having the following general formula (2):

$$(R^4)_x(R^5)_y Si(X)_{4-x-y} \quad (2)$$

wherein $R^4$ and $R^5$ are each independently hydrogen or a substituted or unsubstituted monovalent hydrocarbon group, X is a halogen atom, alkoxy group having 1 to 3 carbon atoms, acyloxy group having 1 to 3 carbon atoms or isocyanate group, x is 0 or 1, y is 0, 1 or 2, and x+y is 0, 1, 2 or 3.

8. The laminate of claim 1, wherein the oxide nanoparticles from which the composite oxide nanoparticles (2-A) are derived have been prepared by heating and vaporizing a zinc source, titanium source or a combination thereof in direct current arc plasma, oxidizing the zinc vapor, titanium vapor or a combination thereof, and cooling.

9. The laminate of claim 1, wherein the oxide nanoparticles from which the composite oxide nanoparticles (2-A) are derived have been prepared by heating and vaporizing a zinc source in direct current arc plasma, oxidizing the zinc vapor, and cooling.

10. The laminate of claim 1, wherein the composite oxide nanoparticles (2-A) have an average particle size (volume average particle size $D_{50}$) of 10 to 200 nm.

11. The laminate of claim 1, wherein the silicone resin (2-B) comprises (2-E) colloidal silica.

12. The laminate of claim 1, wherein the multilayer coating system further includes a bottom layer (III) disposed contiguous to the surface of the lower layer (II) that is disposed adjacent to the substrate, the bottom layer (III) being an acrylic resin coating.

13. The laminate of claim 1, wherein the silicone coating composition of which the lower layer (II) is formed further comprises an organic UV absorber, an organic UV stabilizer or a combination thereof.

14. The laminate of claim 1, wherein the organic resin substrate is a molded polycarbonate resin.

15. The laminate of claim 3, wherein the inner sub-layer has a refractive index in the range of 1.445 to 1.493 and the outer sub-layer has a refractive index in the range of 1.430 to 1.456.

16. The laminate of claim 3, wherein the inner sub-layer has a nano-indentation hardness in the range of 1.123 to 1.366 GPa and the outer sub-layer has a nano-indentation hardness in the range of 1.345 to 1.449 GPa.

17. The laminate of claim 15, wherein the outer sub-layer has a refractive index in the range of 1.430 to 1.435.

18. The laminate of claim 4, wherein the outermost layer (I) has a total thickness in the range of 3.0 to 4.5 μm.

19. The laminate of claim 11, wherein the colloidal silica (2-E) is present in an amount of 5 to 100 parts by weight per 100 parts by weight of the silicone resin (2-B).

20. The laminate of claim 12, wherein the bottom layer (III) is a cured film of an acrylic resin coating composition comprising
(3-A) a vinyl copolymer having an organic UV-absorptive group and an alkoxysilyl group on side chains,
(3-B) a crosslinking agent, and
(3-C) a solvent.

21. The laminate of claim 12, wherein the acrylic resin coating composition of which the bottom layer (III) is formed further comprises an organic UV absorber, an organic UV stabilizer or a combination thereof.

22. The laminate of claim 20, wherein component (3-A) in the acrylic resin coating composition of which the bottom layer (III) is formed is a copolymer of (3-A-i) a vinyl monomer having an alkoxysilyl group bonded via a Si—C bond, (3-A-ii) a vinyl monomer having an organic UV-absorptive group, and (3-A-iii) another monomer capable of copolymerizing with the vinyl monomers.

23. The laminate of claim 20, wherein the crosslinking agent (3-B) in the acrylic resin coating composition of which the bottom layer (III) is formed is colloidal silica.

24. The laminate of claim 20, wherein the crosslinking agent (3-B) in the acrylic resin coating composition of which the bottom layer (III) is formed is a polyorganosiloxane.

* * * * *